United States Patent
Yamamoto

(10) Patent No.: US 7,073,017 B2
(45) Date of Patent: Jul. 4, 2006

(54) EFFICIENT UPDATE OF FIRMWARE IN A DISK-TYPE STORAGE DEVICE

(75) Inventor: Masanobu Yamamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 10/847,920

(22) Filed: May 19, 2004

(65) Prior Publication Data

US 2005/0188170 A1    Aug. 25, 2005

(30) Foreign Application Priority Data

Feb. 25, 2004    (JP)    ............. 2004-049765

(51) Int. Cl.
G06F 13/10    (2006.01)
G06F 12/06    (2006.01)
G06F 9/445    (2006.01)
G06G 9/00    (2006.01)

(52) U.S. Cl. ............... 711/103; 711/112; 717/168; 713/1

(58) Field of Classification Search ............... 707/203; 711/102–103, 113; 713/1–2; 717/168
See application file for complete search history.

(56) References Cited

U.S. PATENT DOCUMENTS 5,781,921 A * 7/1998 Nichols ............... 711/115
6,085,333 A * 7/2000 DeKoning et al. ............... 714/7
6,209,060 B1 * 3/2001 Machida .................. 711/114
6,370,645 B1 * 4/2002 Lee ........................... 713/2
6,442,067 B1    8/2002 Chawla et al.
6,549,978 B1    4/2003 Mansur et al.
6,745,324 B1 * 6/2004 Skazinski et al. ........... 713/2
6,907,602 B1 * 6/2005 Tsai et al. ................. 717/168
2002/0046265 A1 * 4/2002 Suzuki ..................... 709/220
2002/0166027 A1 * 11/2002 Shirasawa et al. ......... 711/114
2003/0110330 A1 * 6/2003 Fujie et al. ................ 710/36
2003/0145130 A1    7/2003 Schultz et al.
2004/0143828 A1    7/2004 Liu et al.
2005/0033933 A1 * 2/2005 Hetrick et al. ............. 711/165
2005/0132091 A1    6/2005 Shibata
2005/0155029 A1 * 7/2005 Nguyen et al. ............. 717/168

FOREIGN PATENT DOCUMENTS

JP    200020398    1/2000

* cited by examiner

Primary Examiner—Donald Sparks
Assistant Examiner—James Golden
(74) Attorney, Agent, or Firm—Mattingly, Stanger, Malur & Brundidge, PLC.

(57) ABSTRACT

The storage control system reads out new-version firmware from a newly installed new disk type storage device to a region in the cache memory, shared memory, or a maintenance terminal. Old-version firmware of one or more disk type storage devices selected from a plurality of in-operation disk type storage devices that were installed prior to the new disk type storage device is then updated to the read-out new-version firmware.

14 Claims, 16 Drawing Sheets

EXCHANGE OF NEW-VERSION FIRMWARE AND OLD-VERSION FIRMWARE VIA CM

EXCHANGE OF NEW-VERSION FIRMWARE AND OLD-VERSION FIRMWARE VIA CM

EXCHANGE OF NEW-VERSION FIRMWARE AND OLD-VERSION FIRMWARE VIA CM

EFFICIENT UPDATE OF FIRMWARE IN A DISK-TYPE STORAGE DEVICE

CROSS-REFERENCE TO PRIOR APPLICATION

This application relates to and claims priority from Japanese Patent Application No. 2004-49765, filed on Feb. 25, 2004, the entire disclosure of which is incorporated herein by reference.

BACKGROUND OF THE INVENTION

1. Field of the Invention

The present invention relates to a storage control system which is connected to a host device, and a method for writing firmware into a disk type storage device belonging to a storage control system.

2. Description of the Related Art

For example, in the case of a main office storage system that handles large volumes of data, data is managed using a storage control system which is constructed separately from the host terminal. For example, this storage control system is also called a "disk array device", and is a RAID (redundant array of independent inexpensive disks) constructed by disposing numerous disk type storage devices in the form of an array.

Generally, firmware that is used to control the hardware inside a disk type storage device is installed in such a disk type storage device. For example, a technique which is devised so that when disk replacement is ascertained during the operation of the system, firmware on a reference disk mounted beforehand is copied onto the replacement disk that is newly mounted as a result of disk replacement, is disclosed in Japanese Patent Application Laid-Open No. 11-134114.

In Japanese Patent Application Laid-Open No. 11-134114, for example, when the firmware installed on the reference disk is an old version, the firmware of this old version is also copied on to the newly mounted replacement disk. Accordingly, in order to copy firmware of a new version onto the replacement disk, it is necessary to alter the firmware that is installed on the reference disk to the firmware of this new version each time that the version of the firmware is updated. Consequently, the efficiency of this system is poor.

SUMMARY OF THE INVENTION

Accordingly, it is an object of the present invention to provide a method and a storage control system which allow the efficient installation of firmware in a disk type storage device selected from a plurality of disk type storage devices.

Other objects of the present invention will become clear from the following description.

The storage control system according to one aspect of the present invention comprises a channel control section which is connected to a host device, and which receives data from this host device, a cache memory which is connected to the abovementioned channel control section, and which holds data that is exchanged with the abovementioned host device, a shared memory which stores control information relating to the data that is exchanged with the abovementioned host device, a plurality of disk control sections which are connected to the abovementioned cache memory, and which control the data that is exchanged with the abovementioned host device so that this data is stored in the abovementioned cache memory or read out from the abovementioned cache memory, and a plurality of disk type storage devices which are connected with the abovementioned plurality of disk control sections using a plurality of fibre channel loops, and in which data that is sent from the abovementioned host device is stored in accordance with the control of the abovementioned plurality of disk control sections. The abovementioned plurality of disk type storage devices include two or more in-operation disk type storage devices which have already been installed in the abovementioned storage control system, and read-out source disk type storage devices which are installed in the abovementioned storage control system later than the abovementioned two or more in-operation disk type storage devices, and which have transfer target firmware, which is to be transferred to read-out destination disk type storage device selected from the abovementioned two or more in-operation disk type storage devices. Among the abovementioned plurality of disk control sections, the read-out source disk control sections that are connected to the same fibre channel loop as the abovementioned read-out source disk type storage devices read out the transfer target firmware from the abovementioned read-out source disk type storage devices, and store the transfer target firmware (which has thus been read out) in the abovementioned cache memory (e.g., in a firmware storage region disposed in the cache memory) or the abovementioned shared memory (e.g., in a specified storage region disposed in the shared memory), or in a maintenance terminal which is connected to the abovementioned plurality of disk control sections, and which maintains or manages the abovementioned storage control system. Likewise, among the abovementioned plurality of disk control sections, the read-out destination disk control section that is connected to the same fibre channel loop as the abovementioned read-out destination disk type storage device transfers the abovementioned stored transfer target firmware to the abovementioned read-out destination disk type storage device via the fibre channel loop that are connected to the abovementioned read-out destination disk control section, and causes this firmware to be stored in the read-out destination disk type storage device. For example, the abovementioned read-out destination disk type storage device sets the abovementioned transfer target firmware received from the abovementioned read-out destination disk control section as the firmware of the abovementioned read-out destination disk type storage device.

For example, the transfer target firmware may be stored anywhere in the disk type storage device. In concrete terms, for example, the transfer target firmware is stored in a specified storage region in the memory or hard disk inside each disk type storage device, and the processor installed in the disk type storage device can control various types of hardware resources inside the disk type storage device by reading in this stored transfer target firmware.

In a first embodiment of this storage control system, the abovementioned read-out source disk control section read out the abovementioned transfer target firmware from the abovementioned read-out source disk type storage devices when it is detected that the abovementioned read-out source disk type storage devices have been installed in the abovementioned storage control system. The abovementioned transfer target firmware is new-version firmware of a newer version than the old-version firmware possessed by the abovementioned read-out destination disk type storage device. The abovementioned read-out destination disk type storage device updates the old-version firmware possessed by the abovementioned read-out destination disk type storage device to the abovementioned new-version firmware that is transferred from the abovementioned transferring disk control section. In concrete terms, for example, the abovementioned read-out destination disk type storage device updates the abovementioned old-version firmware to the abovementioned new-version firmware in accordance with an updating program possessed by the abovementioned new-version firmware; then, by rebooting, the abovementioned new-version firmware is updated as the firmware of the abovementioned read-out destination disk type storage device.

Furthermore, for example, the new-version firmware that is stored by the read-out source disk type storage devices may be independent firmware that does not use the old-version firmware at all, or may be firmware that functions as new-version firmware by using information of the old-version firmware (e.g., an aggregation of program modules in which additions, alterations or deletions are made with respect to the old-version firmware).

A second embodiment of this storage control system is the abovementioned first embodiment, wherein the abovementioned read-out source disk type storage devices store update target old-version information, in which one or more update target old versions of firmware that is to be updated to the abovementioned new-version firmware are written, in addition to the abovementioned new-version firmware. The abovementioned read-out source disk control sections read out the abovementioned new-version firmware and the abovementioned update target old-version information from the abovementioned read-out source disk type storage devices, and store this information in a firmware storage region disposed in the abovementioned cache memory. The abovementioned read-out destination disk control section compares the update target old-version information that is stored in the abovementioned firmware storage region with the old versions of two or more sets of old-version firmware respectively possessed by the two or more in-operation disk type storage devices connected to the same fibre channel loop as the abovementioned read-out destination disk control section, and when at least one of the abovementioned two or more old versions matches at least one of the abovementioned one or more update target old versions, the read-out destination disk type storage device which has the old-version firmware of the abovementioned matching old version is selected from the abovementioned two or more in-operation disk type storage devices, and the abovementioned new-version firmware in the abovementioned firmware storage region is transferred to the abovementioned selected read-out destination disk type storage device. The abovementioned firmware storage region can be accessed by all of the abovementioned plurality of disk control sections.

A third embodiment of this storage control system is the abovementioned first embodiment, wherein the abovementioned read-out source disk type storage devices store the update target old-version information, in which one or more update target old versions of firmware that is to be updated to the abovementioned new-version firmware are written, in addition to the abovementioned new-version firmware. The abovementioned read-out source disk control sections read out the abovementioned new-version firmware and the abovementioned update target old-version information from the abovementioned read-out source disk type storage devices, and store this information in a read-out destination region disposed in the abovementioned shared memory. The abovementioned read-out destination disk control section compares the update target old-version information that is stored in the abovementioned read-out destination region with the old versions of two or more sets of old-version firmware respectively possessed by the two or more in-operation disk type storage devices connected to the same fibre channel loop as the abovementioned read-out destination disk control section, and when at least one of the abovementioned two or more old versions matches at least one of the abovementioned one or more update target old versions, the read-out destination disk type storage device which has the old-version firmware of the abovementioned matching old version is selected from the abovementioned two or more in-operation disk type storage devices, and the abovementioned new-version firmware in the abovementioned read-out destination storage region is transferred to the abovementioned selected read-out destination disk type storage device. The abovementioned read-out destination region can be accessed only by the abovementioned read-out source disk control sections and the abovementioned read-out destination disk control section among the abovementioned plurality of disk control sections.

In this third embodiment, for example, the read-out destination disk control section comprises a disk processor (e.g., a microprocessor) and a local memory (e.g., a volatile or nonvolatile memory). The disk processor stores the abovementioned new-version firmware acquired from the abovementioned accessible read-out destination region, and the abovementioned update target old-version information, in the abovementioned local memory. Furthermore, the disk processor compares the update target old-version information that is stored in the abovementioned local memory with the old versions of the two or more sets of old-version firmware that are respectively possessed by the two or more in-operation disk type storage devices that are connected to the same fibre channel loop as the abovementioned read-out destination disk control section.

A fourth embodiment of this of this storage control system is the abovementioned first embodiment, wherein the abovementioned read-out source disk type storage devices store update target old-version information, in which one or more update target old versions of firmware that is to be updated to the abovementioned new-version firmware are written, in addition to the abovementioned new-version firmware. The abovementioned read-out source disk control sections read out the abovementioned new-version firmware and the abovementioned update target old-version information from the abovementioned read-out source disk type storage devices, and store this information in the abovementioned maintenance terminal. The abovementioned maintenance terminal comprises a storage unit (e.g., a hard disk or memory). The abovementioned maintenance terminal stores the abovementioned new-version firmware and the abovementioned update target old-version information that are received from the abovementioned read-out source disk control sections in the abovementioned storage unit. Furthermore, the abovementioned maintenance terminal receives the old versions of two or more sets of old-version firmware respectively possessed by the two or more in-operation disk type storage devices that are connected to the same fibre channel loop as the abovementioned read-out destination disk control section from the abovementioned read-out destination disk control section, and stores this information in the abovementioned storage unit. The abovementioned maintenance terminal compares the update target old-version information that is stored in the abovementioned storage unit with the two or more old versions that are stored in the storage unit, and when at least one of the two or more old versions matches at least one of the abovementioned one or more update target old versions, the read-out destination disk type storage device which has the old-version firmware of the abovementioned matching old version is selected from the abovementioned two or more in-operation disk type storage devices. The abovementioned maintenance terminal transfers the abovementioned new-version firmware acquired from the abovementioned storage unit to the abovementioned read-out destination disk control section with the abovementioned selected read-out destination disk type storage device as the destination. The abovementioned read-out destination disk control section receives the abovementioned new-version firmware whose destination is the abovementioned selected read-out destination disk type storage device from the abovementioned maintenance terminal, and transfers the abovementioned new-version firmware to the abovementioned selected read-out destination disk type storage device.

In a fifth embodiment of this storage control system, the abovementioned read-out source disk type storage devices store disk attribute information that includes disk attributes of one or more disk type storage devices in which the abovementioned transfer target firmware can operate normally. The abovementioned read-out source disk control sections read out the abovementioned disk attribute information from the abovementioned read-out source disk type storage devices, and store this information in the abovementioned cache memory, the abovementioned shared memory or the abovementioned maintenance terminal. The abovementioned read-out destination disk control section compares the abovementioned stored disk attribute information with two or more disk attributes respectively corresponding to the two or more in-operation disk type storage devices connected to the same fibre channel loop as the abovementioned read-out destination disk control section, and if at least one of the abovementioned two or more disk attributes matches at least one of the one or more disk attributes contained in the abovementioned disk attribute information, the read-out destination disk type storage device which has the abovementioned matching disk attribute is selected from the abovementioned two or more in-operation disk type storage devices, and the abovementioned new-version firmware is transferred to the abovementioned selected read-out destination disk type storage device.

Here, for example, disk attributes are at least one of the following: maker or model of the disk type storage device, and OS information (e.g., OS type or version).

In a sixth embodiment of this storage control system, the read-out destination disk type storage device uses either first or second firmware, and exchange data with the abovementioned read-out destination disk control section. The other firmware that is not in use is updated to the abovementioned transfer target firmware, and when the use of the abovementioned first or second firmware is completed, this first or second firmware is updated to the abovementioned transfer target firmware.

A seventh embodiment of this storage control system is the abovementioned first embodiment, wherein when the abovementioned old-version firmware is to be updated to the abovementioned new-version firmware, the read-out destination disk type storage device copies the abovementioned old-version firmware into storage regions disposed in the abovementioned read-out destination disk type storage device, and when there is a failure in the transfer of the abovementioned new-version firmware to the abovementioned read-out destination disk type storage device, the abovementioned old-version firmware copied into the abovementioned storage regions is restored as the firmware of the abovementioned read-out destination disk type storage device.

In an eighth embodiment of this storage control system, the abovementioned read-out source disk control sections transmit the abovementioned read-out transfer target firmware to the abovementioned maintenance terminal. When there is a failure in the transfer of the transfer target firmware that is read out from the abovementioned cache memory or the abovementioned shared memory to the abovementioned read-out destination disk type storage device, the abovementioned read-out destination disk control section notifies the abovementioned maintenance terminal that there has been a transfer failure, and when the abovementioned transfer target firmware is received from the abovementioned maintenance terminal in response to the abovementioned notification of transfer failure, the abovementioned received transfer target firmware is transferred to the abovementioned read-out destination disk type storage device.

In a ninth embodiment of this storage control system, two or more read-out source disk type control sections are included in the abovementioned plurality of disk type storage devices. When two or more read-out source disk type storage devices constituting the same RAID group are installed, the read-out source disk control sections connected to the same fibre channel loop as the read-out source disk type storage devices selected from the abovementioned two or more read-out source disk type storage devices read out the transfer target firmware from the abovementioned selected read-out source disk type storage devices.

The method according to an aspect of the present invention is a method for installing firmware in disk type storage devices possessed by a storage control system connected to a host device, comprising the steps of reading out transfer target firmware that is to be transferred to read-out destination disk type storage device selected from two or more in-operation disk type storage devices among a plurality of disk type storage devices disposed in the abovementioned storage control system from read-out source disk type storage devices that were installed in the abovementioned storage control system later than the abovementioned two or more in-operation disk type storage devices, storing the abovementioned read-out transfer target firmware in a cache memory which stores data that is exchanged with the abovementioned host device, a shared memory which stores control information relating to data that is exchanged with the abovementioned host device, or a maintenance terminal which maintains or manages the abovementioned storage control system, and transferring the abovementioned stored transfer target firmware to the abovementioned read-out destination disk type storage device and causing this firmware to be stored in the read-out destination disk type storage device.

In a first embodiment of this method, the method further comprises the step of detecting that the abovementioned read-out source disk type storage devices have been installed in the abovementioned storage control system, the abovementioned transfer target firmware is new-version firmware of a newer version than the old-version firmware possessed by the abovementioned read-out destination disk type storage device; furthermore, in the abovementioned read-out step, when it is detected that the abovementioned read-out source disk type storage devices have been installed in the abovementioned storage control system, the abovementioned new-version firmware is read out from the abovementioned read-out source disk type storage devices, and in the abovementioned storage step, the old-version firmware possessed by the abovementioned read-out destination disk type storage device is updated to the abovementioned new-version firmware that is transferred from the abovementioned transferring disk control sections.

A second embodiment of this method is the abovementioned first embodiment, wherein the abovementioned read-out source disk type storage devices store update target old-version information in which one or more old versions (that are to be updated) of the firmware that is to be updated to the abovementioned new-version firmware are written, in addition to the abovementioned new-version firmware. In the abovementioned read-out step, the abovementioned new-version firmware and the abovementioned update target old-version information are read out from the abovementioned read-out source disk type storage devices. In the abovementioned storage step, the firmware is stored in the abovementioned firmware storage region disposed in the abovementioned cache memory. In the abovementioned transfer step, the update target old-version information that is stored in the abovementioned firmware storage region is compared with the old versions of two or more sets of old-version firmware respectively possessed by two or more in-operation disk type storage devices that are connected to the same fibre channel loop as the abovementioned read-out destination disk control section, and when at least one of the abovementioned two or more old versions matches at least one of the abovementioned one or more update target old versions, the read-out destination disk type storage device which has the old-version firmware of the abovementioned matching old version is selected from the abovementioned two or more in-operation disk type storage devices, and the abovementioned new-version firmware in the abovementioned firmware storage region is transferred to the abovementioned selected read-out destination disk type storage device.

A third embodiment of this method is the abovementioned first embodiment, wherein the abovementioned read-out source disk type storage devices store update target old-version information in which one or more old versions (that are to be updated) of the firmware that is to be updated to the abovementioned new-version firmware are written, in addition to the abovementioned new-version firmware. In the abovementioned read-out step, the abovementioned new-version firmware and the abovementioned update target old-version information are read out from the abovementioned read-out source disk type storage devices.

In the abovementioned storage step, the abovementioned read-out new-version firmware and the abovementioned update target old-version information are stored in a read-out destination region disposed in the abovementioned shared memory.

In the abovementioned transfer step, the update target old-version information that is stored in the abovementioned read-out destination region is compared with the old versions of two or more sets of old-version firmware respectively possessed by two or more in-operation disk type storage devices that are connected to the same fibre channel loop as the abovementioned read-out destination disk control section, and when at least one of the abovementioned two or more old versions matches at least one of the abovementioned one or more update target old versions, the read-out destination disk type storage device which has the old-version firmware of the abovementioned matching old version is selected from the abovementioned two or more in-operation disk type storage devices, and the abovementioned new-version firmware in the abovementioned read-out destination region is transferred to the abovementioned read-out destination disk type storage device.

A fourth embodiment of the present method is the abovementioned first embodiment, wherein the abovementioned read-out source disk type storage devices store update target old-version information in which one or more update target old versions of the firmware that is to be updated to the abovementioned new-version firmware is written, in addition to the abovementioned new-version firmware. The abovementioned maintenance terminal has a storage unit. In the abovementioned read-out step, the abovementioned new-version firmware and the abovementioned update target old-version information are read out from the abovementioned read-out source disk type storage devices. In the abovementioned storage step, the abovementioned new-version firmware that has been read out and the abovementioned update target old-version information are transmitted to the abovementioned maintenance terminal and stored in the abovementioned storage unit of the abovementioned maintenance terminal; furthermore, the old versions of two or more sets of old-version firmware respectively possessed by the abovementioned two or more in-operation disk type storage devices are stored in the storage unit of the abovementioned maintenance terminal. In the abovementioned transfer step, the update target old-version information that is stored in the abovementioned storage unit is compared with the two or more old versions that are stored in the abovementioned storage unit, and when at least one of the abovementioned two or more old versions matches at least one of the abovementioned one or more update target old versions, the read-out destination disk type storage device which has the old-version firmware of the abovementioned matching old version is selected from the abovementioned two or more in-operation disk type storage devices, and the abovementioned new-version firmware acquired from the abovementioned storage unit is transferred to the abovementioned selected read-out destination disk type storage device.

In a fifth embodiment of this method, the abovementioned read-out source disk type storage devices store disk attribute information that includes disk attributes of one or more disk type storage devices in which the abovementioned transfer target firmware can operate normally. In the abovementioned read-out step, the abovementioned disk attribute information is read out from the abovementioned read-out source disk type storage devices. In the abovementioned storage step, the abovementioned disk attribute information that has been read out is stored in the abovementioned cache memory, the abovementioned shared memory or the abovementioned maintenance terminal. In the abovementioned transfer step, the abovementioned stored disk attribute information is compared with two or more disk attributes respectively corresponding to two or more in-operation disk type storage devices, and when at least one of the abovementioned two or more disk attributes matches at least one of the one or more disk attributes contained in the abovementioned disk attribute information, the read-out destination disk type storage device which has the abovementioned matching disk attribute is selected from the abovementioned two or more in-operation disk type storage devices, and the abovementioned new-version firmware is transferred to the abovementioned selected read-out destination disk type storage device.

In a sixth embodiment of this method, when the read-out destination disk type storage device is exchanging data with the abovementioned read-out destination disk control section using either the first or second firmware in the abovementioned storage step, the other firmware that is not in use is updated to the abovementioned transfer target firmware, and when the use of the abovementioned first or second firmware that was in use is completed, this firmware is updated to the abovementioned transfer target firmware.

In a seventh embodiment of this method, this method further comprises the steps of copying the abovementioned old-version firmware into a storage region disposed in the abovementioned read-out destination disk type storage device when the abovementioned old-version firmware is updated to the abovementioned new-version firmware, and restoring the abovementioned old-version firmware that has been copied into the abovementioned storage region as the firmware of the abovementioned read-out destination disk type storage device when there is a failure in the transfer of the abovementioned new-version firmware to the abovementioned read-out destination disk type storage device.

In an eighth embodiment of this method, this method further comprises the step of notifying the abovementioned maintenance terminal of a transfer failure when there is a failure in the transfer of the transfer target firmware that is read out from the abovementioned cache memory or the abovementioned shared memory to the abovementioned read-out destination disk type storage device. In the abovementioned transfer step, the abovementioned transfer target firmware that is output from the abovementioned maintenance terminal in response to the abovementioned notification of transfer failure is transferred to the abovementioned read-out destination disk type storage device.

In a ninth embodiment of this method, the abovementioned plurality of disk type storage devices include two or more read-out source disk type storage devices. In the abovementioned read-out step, when two or more read-out source disk type storage devices forming the same RAID group are installed, disk control sections connected to the same fibre channel loop as the read-out source disk type storage device selected from the abovementioned two or more read-out source disk type storage devices read out the transfer target firmware from the abovementioned selected read-out destination disk type storage device.

The storage control system according to another aspect of the present invention is a storage control system connected to a host device, comprising a plurality of disk type storage devices, one or a plurality of memories, and a storage control unit. The abovementioned storage control unit controls the exchange of data between the abovementioned host device and the abovementioned plurality of disk type storage devices. When it is detected that a first disk type storage device has been installed in the abovementioned storage control system, the abovementioned storage control unit reads out the new-version firmware possessed by the abovementioned first disk type storage device, and stores this firmware in the abovementioned memories (or in a maintenance terminal which is connected to the abovementioned storage control unit for the purpose of maintaining or managing the abovementioned storage control system). Furthermore, the abovementioned storage control unit acquires the new-version firmware stored in the abovementioned memories or the abovementioned maintenance terminal, and transfers the abovementioned new-version firmware to one or more third disk type storage devices selected from a plurality of second disk type storage devices that were installed before the installation of the abovementioned first disk type storage device. The abovementioned third disk type storage devices update the old-version firmware possessed by the abovementioned third disk type storage devices (firmware of a version older than that of the abovementioned new-version firmware) to the new-version firmware received from the abovementioned storage control unit.

In a first embodiment of this storage control system, the abovementioned memories or the storage unit of the abovementioned maintenance terminal store attribute information for the update target old version that expresses one or more old version attributes (e.g., old version identifying information) of the update target firmware to the abovementioned new-version firmware. The abovementioned storage control unit acquires version attributes of a plurality of sets of firmware respectively possessed by the abovementioned plurality of second disk type storage devices from the abovementioned plurality of second disk type storage devices, and stores these version attributes in the abovementioned memories or the abovementioned maintenance terminal. The abovementioned storage control unit compares the abovementioned stored plurality of version attributes an the abovementioned stored attribute information for the update target old version, and when at least one of the abovementioned stored plurality of version attributes matches at least one of the one or more old version attributes expressed by the abovementioned stored attribute information for the update target old version, the second disk type storage devices in which old-version firmware that has the abovementioned matching old version attribute is installed are selected as the abovementioned third disk type storage devices.

A second embodiment of this storage control system is the abovementioned first embodiment, wherein the abovementioned memories or the storage unit of the abovementioned maintenance terminal store disk attribute information expressing one or more disk attributes (e.g., at least one of the disk attributes of model, maker and OS) of disk type storage devices in which the abovementioned new-version firmware can operate normally. The abovementioned storage control unit compares a plurality of second disk attributes respectively corresponding to the abovementioned plurality of second disk type storage devices with the one or more disk attributes expressed by the abovementioned disk attribute information, and when at least one of the abovementioned plurality of second disk attributes matches at least one of the abovementioned one or more disk attributes, the second disk type storage devices possessing the abovementioned matching disk attributes are selected as the abovementioned third disk type storage devices.

DESCRIPTION OF THE PREFERRED EMBODIMENTS

Below, one embodiment of the present invention will be described with reference to the attached figures.

First, one concept of the present embodiment will be briefly described.

For example, in the storage control system of the present embodiment, new-version firmware is read out from a newly installed first disk type storage device, and the old-version firmware (firmware of a version older than that of the abovementioned new-version firmware) of one or more third disk type storage devices selected from a plurality of second disk type storage devices that were installed prior to the abovementioned first disk type storage device is updated to the abovementioned read-out new-version firmware. As a result, mere installation of the first disk type storage device which has the new-version firmware causes the old-version firmware in the third disk type storage devices that have already been installed to be updated to the new-version firmware.

This embodiment will be described in detail below.

Figure 1:
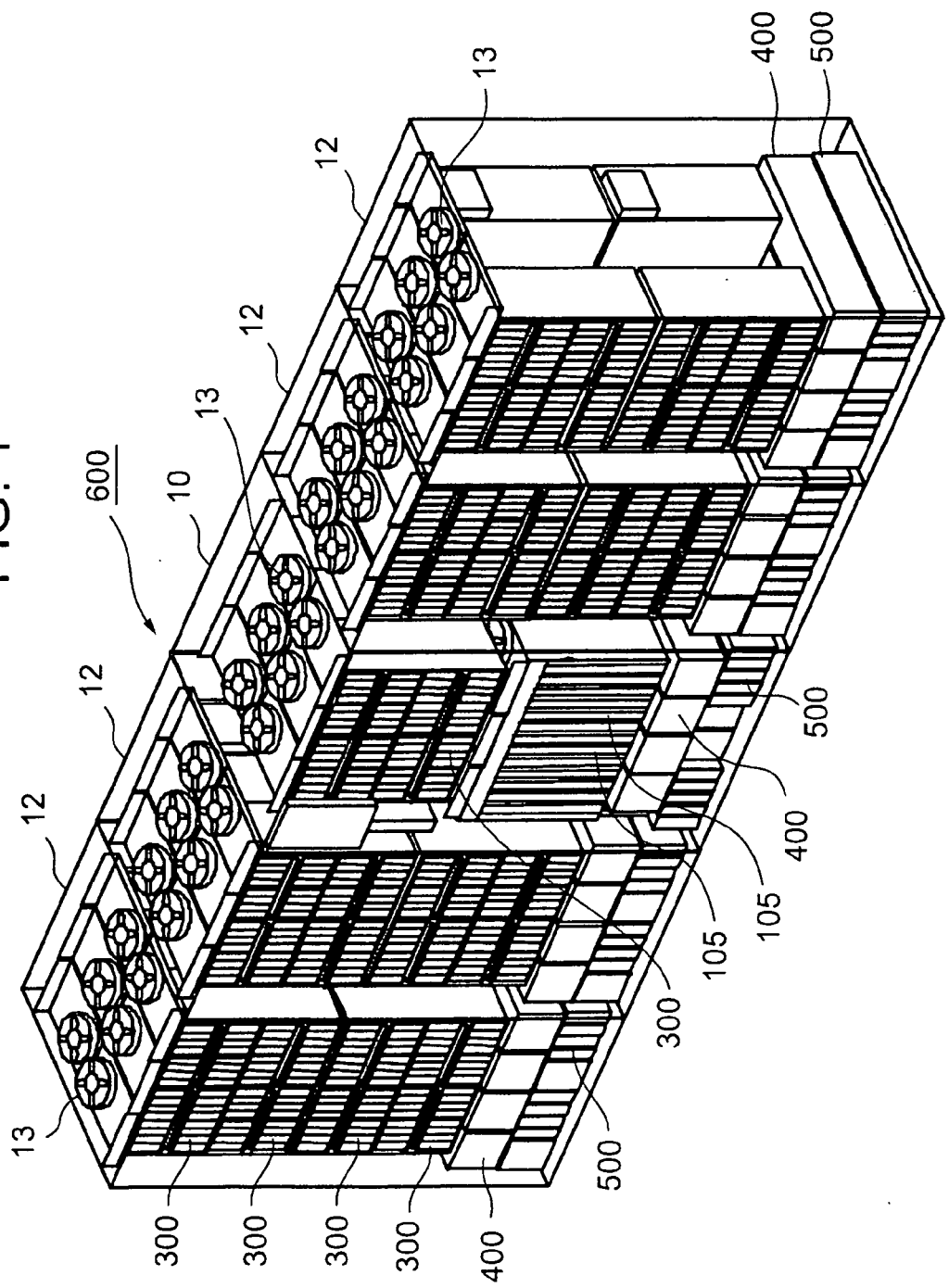
FIG. 1 shows an outline of the external appearance of a storage control system constituting one embodiment of the present invention.

FIG. 1 shows an outline of the external appearance of the abovementioned storage control system constituting an embodiment of the present invention.

For example, the storage control system 600 can be constructed from a basic housing 10 and a plurality of added housings 12 (the storage control system 600 may also be constructed from a basic housing 10 alone).

The basic housing 10 is the minimum constituent unit of the storage control system 600. For example, a plurality of disk type storage devices (e.g., hard disk drives (HDD)) 300, a plurality of control packages (e.g., channel control sections or disk control sections described later) 105, a plurality of power supply units 400 and a plurality of battery units 500 are respectively detachably disposed in this basic housing 10. Furthermore, a plurality of cooling fans 13 are disposed in the basic housing 10.

Each added housing 12 is an option of the storage control system 600; for example, a maximum of four added housings 12 can be connected to one basic housing 10. A plurality of cooling fans 13 are disposed in each added housing 12. Furthermore, a plurality of disk type storage devices 300, a plurality of power supply units 400 and a plurality of battery units 500 are respectively detachably disposed in each added housing 12. For example, each of these parts is controlled by the control function of the control packages 105 disposed in the basic housing 10.

Figure 2:
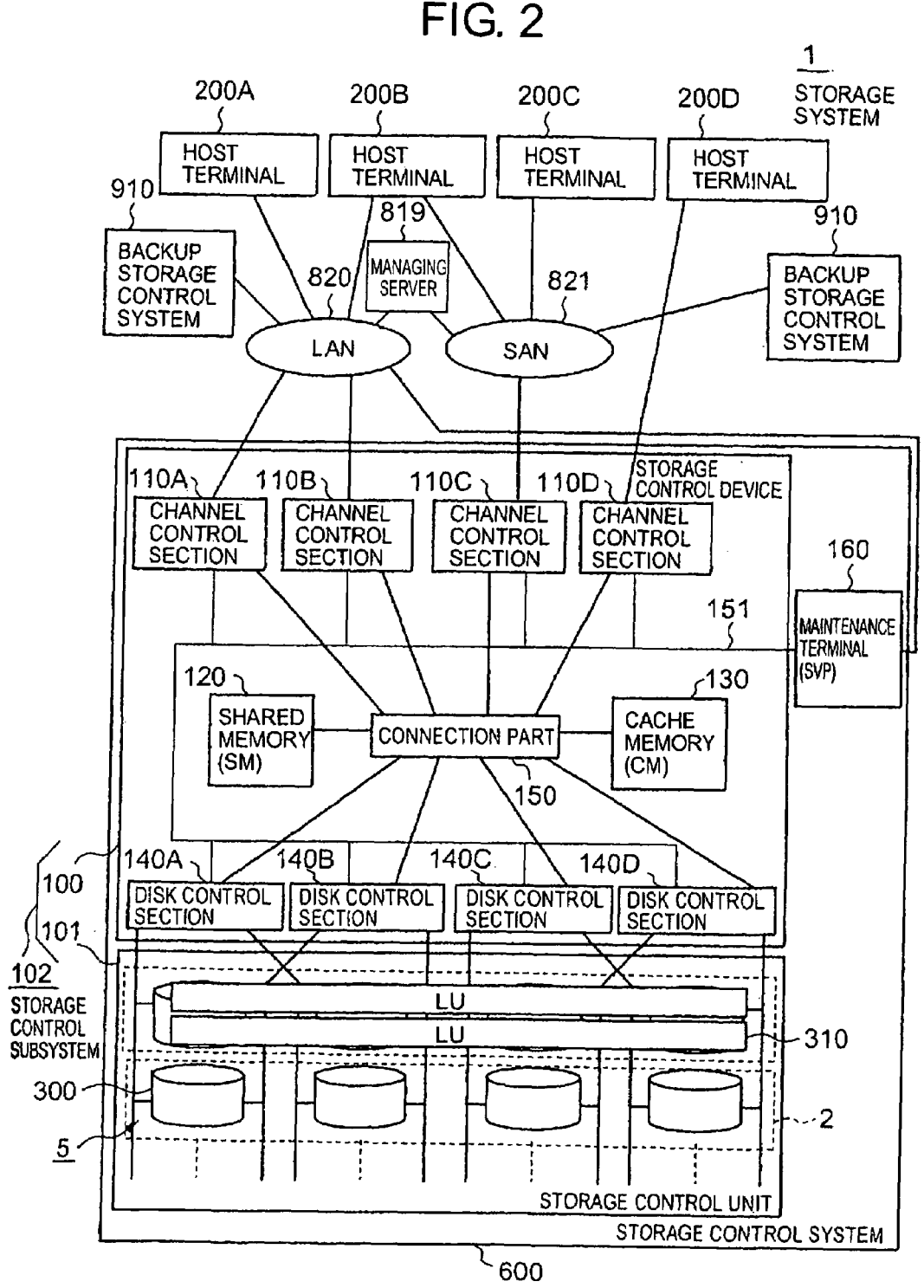
FIG. 2 shows an example of the overall construction of a storage system constituting one embodiment of the present invention.

FIG. 2 shows an example of the overall construction of a storage system constituting an embodiment of the present invention.

The basic constituent elements of this storage system 1 are one or a plurality of host terminals 200A through 200D, and a storage control system 600.

For example, each of the host terminals (host devices) 200A through 200D is a computer system (e.g., personal computer or workstation) comprising a CPU (central processing unit), a non-volatile and/or volatile memory (e.g., ROM or RAM), and hardware resources such as a hard disk drive or the like. As a result of the CPU of each host terminal 200A through 200D reading in and executing various types of computer programs, processing is performed in which the computer programs and hardware resources (e.g., memory) cooperate, so that various functions are realized. Each of the host terminals 200A through 200D can be connected to the storage control system 600 by various methods.

For example, the host terminals 200A and 200B are connected to the storage control system 600 via a first communications network (e.g., a LAN, the internet or a dedicated circuit; hereafter, it will be assumed that this network is a LAN) 820. For example, the communications between the host terminals 200A and 200B and the storage control system 600 that are performed via the LAN 820 are performed according to a TCP/IP protocol. Disk access requests based on the designation of file names (data input and output requests in file units, hereafter referred to as "file access requests") are transmitted to the storage control system 600 from the host terminals 200A and 200B.

Furthermore, for example, the host terminals 200B and 200C are connected to the storage control system 600 via a second communications network (e.g., a SAN (storage area network); hereafter, it will be assumed that this network is a SAN) 821. For example, communications between the host terminals 200B and 200C and the storage control system 600 that are performed via the SAN 821 are performed according to a fibre channel protocol. Data access requests in block units (hereafter referred to as "block access requests") are transmitted to the storage control system 600 from the host terminals 200B and 200C (furthermore, the term "block unit" refers to a unit comprising a block which is a data control section in the storage regions of the disk type storage devices 300 described later).

Furthermore, for example, the host terminal 200D is connected to the storage control system 600 without the interposition of a network such as a LAN 820, SAN 821 or the like. For example, a main frame computer may be used as the host terminal 200D. For example, communications between the host terminal 200D and the storage control system 600 are performed according to a communications protocol such as FICON (Fibre Connection; registered trademark), ESCON (Enterprise System Connection; registered trademark), ACONARC (Advanced Connection Architecture; registered trademark), FIBARC (Fibre Connection Architecture; registered trademark) or the like. For example, block access requests are transmitted to the storage control system 600 from the host terminal 200D in accordance with one of these communications protocols.

For example, a backup storage control system 910 is connected to at least one of the abovementioned communications networks, i.e., either the LAN 820 or SAN 821. For example, the backup storage control system 910 may be a storage control system which stores data in a disk type device selected from one or a plurality of disk type devices (e.g., MO, CD-R or DVD-RAM), a storage control system such as the storage control system 600 described in detail later, or a storage control system which stores data in a tape type device selected from one or a plurality of tape type devices (e.g., DAT tapes, cassette tapes, open tapes or cartridge tapes). For example, the backup storage control system 910 receives data that is stored in the storage control system 600 via the LAN 820 or SAN 821 (or via a host terminal which is further connected to the backup storage control system 910), and stores this data in a storage device (e.g., tape type device) disposed in the backup storage control system 910 itself.

Furthermore, for example, a managing server 819 may be connected to at least the LAN 820 (among the LAN 820 and SAN 821). For example, this managing server 819 may relay communications between host terminals and other host terminals, and communications between host terminals and the storage control system 600.

Furthermore, the host terminals 200A through 200D may be connected to each other via a third communications network (e.g., a LAN).

For example, the storage control system 600 is a RAID (redundant array of independent inexpensive disks) system. The storage control system 600 performs control in accordance with commands received from the host terminals 200A through 200D. The storage control system 600 comprises a storage control subsystem (disk array device) 102, and a maintenance terminal (hereafter referred to as an "SVP", which is an abbreviation of "service processor") 160. The storage control subsystem 102 comprises a storage control device 100 and a storage device unit 101. The storage control device 100 comprises one or a plurality of channel control sections 110A through 110D, one or a plurality of cache memories (hereafter referred to as "CM", which is an abbreviation of "cache memory") 130, one or a plurality of shared memories (hereafter referred to as "SM", which is an abbreviation of "shared memory") 120, one or a plurality of disk control sections 140A through 140D, and a connection part 150. The storage device unit 101 comprises one or more physical disk groups 5. Each of the one or more physical disk groups 5 has a plurality of disk type storage devices 300 arranged in the form of an array.

Each of the channel control sections 110A through 110D can be constructed from hardware circuits, software or a combination of both. Each channel control section 110A through 110D is detachable with respect to the storage control device 100 (e.g., the basic housing 10), and may be called a channel adapter. For example, each of the channel control sections 110A through 110D respectively comprises a printed circuit board on which a processor, memory and the like are mounted, and a control program stored in the memory, and specified functions are realized by the cooperative action of this hardware and software. Each of the channel control sections 110A through 110D is multiplexed (e.g., duplexed), so that even if one channel control section is damaged, the operation can be performed by another channel control section. The channel control sections 110A through 110D perform processing in accordance with commands received from the host terminals while referring to control information or the like (e.g., an LU-LDEV management table described later) in the SM 120. First, the operation will be described (including the operation of the disk control sections 140A through 140D) using the channel control section 110C (among the channel control sections 110A through 110D) as an example. For example, when the channel control section 110C receives an I/O request (input-output request, here a block access request) including a read request from the host terminal 200A or 200B, a read-out command is stored in the SM 120, and a cache region is ensured in the CM 130. The disk control sections 140A through 140D occasionally refer to the SM 120, and when an unprocessed read-out command is discovered, data (typically user data that is exchanged between the host terminals 200A through 200D and the disk type storage devices 300) is read out from the disk type storage device 300 and stored in the abovementioned cache region ensured in the CM 130. The channel control section 110C reads out the data transferred to the CM 130 from the cache region, and transmits this data to the host terminal 200A or 200B that originated the read request.

Furthermore, for example, when the channel control section 110C receives an I/O request including a write request from the host terminal 200B or 200C, a write command is stored in the SM 120; furthermore, a cache region is ensured in the CM 130, and the data contained in the received I/O request is stored in this ensured cache region. Subsequently, the channel control section 110C reports the completion of writing to the host terminal 200B or 200C that originated the write request. Furthermore, the disk control sections 140A through 140D occasionally refer to the SM 120, and when an unprocessed write command is discovered, data is read out from the abovementioned cache region ensured in the CM 130 in accordance with this write command, and this data is stored in a specified disk type storage device 300.

The abovementioned processing can also be performed by the other channel control sections 110A through 110B and 110D. Furthermore, the channel control sections 110A through 110B perform the abovementioned processing after converting the file access request into a block access request (e.g., after converting the file name contained in the file access request into a logical block address in accordance with their own file system).

The disk control sections 140A through 140D can be constructed from hardware circuits, software or a combination of both hardware circuits and software. Each of the channel control sections 140A through 140D is detachable with respect to the storage control device 100 (e.g., the basic housing 10 or added housing 12), and may be called a disk adapter. For example, the disk control sections 140A through 140D respective comprise a printed circuit board on which a processor, memory and the like are mounted, and a control program stored in the memory. Specified functions are realized by the cooperative operation of this hardware and software. Each of the disk control sections 140A through 140D is multiplexed (e.g., duplexed), so that even if one of the disk control section is damaged, the operation can be performed by other disk control sections. The disk control sections 140A through 140D control data communications with the respective disk type storage devices 300 contained in the respective physical disk groups 5 while referring to control information or the like (e.g., an LU-LDEV management table described later) in the SM 120. For example, the respective disk control sections 140A through 140D and the respective disk type storage devices 300 are connected via a communications network such as a SAN or the like, and perform data transfer in block units according to a fibre channel protocol. Furthermore, the disk control sections 140A through 140D occasionally monitor the status of the disk type storage devices 300, and the results of this monitoring are transmitted to the SVP 160 via an internal communications network (e.g., a LAN) 151.

For example, the abovementioned one or plurality of CMs 130 are volatile or non-volatile memories. Cache regions are ensured in the CMs 130, and data that is transmitted and received between the channel control sections 110A through 110D and disk control sections 140A through 140D is stored in these regions. This data may also be multiplex-managed by a plurality of CMs 130.

The abovementioned one or plurality of SMs 120 are constructed from (e.g.) non-volatile memories, and store control information and the like (for example, such control information and the like may also be multiplex-managed by a plurality of SMs 120). For example, such control information and the like may include various types of commands that are exchanged between the channel control sections 110A through 110D and disk control sections 140A through 140D, a cache management table, a disk management table, and an LU-LDEV management table. For example, the cache management table is a table in which the correspondence relationship between the cache regions and the LDEV logical addresses (described later) is written. The disk management table is a table which is used to manage the respective disk type storage devices 300, and has (for example) a disk ID, vendor, storage capacity, RAID level, use status (e.g., in use or not in use) and the like for each disk type storage device 300. The LU-LDEV management table is a table which is used to manage the LDEV (described later); for example, this table has logical path information (e.g., port number, target ID and LUN), address management information (e.g., correspondence relationship between physical addresses in the disk type storage device 300 and logical addresses in the LDEV), storage capacity and RAID level for each LDEV. Furthermore, the physical address refers to address information including (for example) the ID, disk head number and number of sectors of the disk type storage device 300. The logical address refers to address information including (for example) the LUN (logical unit number), LDEV number and logical block address.

The connection part 150 mutually connects the respective channel control sections 110A through 110D, the respective disk control sections 140A through 140D, the CMs 130 and the SMs 120. The transfer of data and commands among the channel control sections 110A through 110D, CMs 130, SMs 120 and disk control sections 140A through 140D is accomplished via the connection part 150. For example, the connection part 150 includes a first sub-connection part through which user data passes, and a second sub-connection part through which control information passes. The respective channel control sections 110A through 110D, the respective disk control sections 140A through 140D and the CM 130 are connected to the first sub-connection part, and the respective channel control sections 110A through 110D, the respective disk control sections 140A through 140D and the SM 120 are connected to the second sub-connection part. For example, at least the first sub-connection part (among the first sub-connection part and second sub-connection part) is a high-speed bus such as an ultra-high-speed cross bus switch or the like that performs data transfer by high-speed switching.

For example, each of the plurality of disk type storage devices 300 is a hard disk drive, semiconductor storage device or the like. A RAID group 2 is constructed by a specified number of the plurality of disk type storage devices 300 (two or more disk type storage devices 300); for example, such groups may also be called parity groups or error correction groups, and are groups of disk type storage devices 300 that conform to the principle of RAID. For example, the system is constructed with the two or more disk type storage devices 300 belonging to the same RAID group 2 mounted on different mother boards, so that even if one disk type storage device 300 malfunctions, the data of the malfunctioning disk type storage device 300 can be recovered using the data of the other remaining disk type storage devices 300. A plurality of LDEVs (logical devices) which are logical storage devices are set in the physical storage region provided by this RAID group 2, and one or more LDEVs among the plurality of LDEVs are provided to the host terminals 200A through 200D from the storage control device 100 as one LU (logical unit) 310 which has an LUN (logical unit number). For example, there are cases in which each LU 310 is paired as a primary LU (data copying source LU) with another LU 310 (data copying destination LU) which constitutes a secondary LU; in such cases, all or part of the data (e.g., data prior to updating) inside the LU 310 in question may be copied into the other LU 310. Furthermore, for example, there are cases in which each LU 310 is paired as a secondary LU with another LU 310 that constitutes a primary LU; in such cases, all or part of the data (e.g., data prior to updating) inside the other LU 310 may be copied into the LU 310 in question.

The SVP 160 is a computer machine which is used to maintain or manage the storage system 600. For example, the SVP 160 can collect information from the respective constituent elements of the storage control system 600 (e.g., the respective channel control sections 110A through 110D and the respective disk control sections 140A through 140D) via a communications network 151 such as an internal LAN or the like. In concrete terms, for example, the OS (operating systems), application programs, driver software and the like installed in the respective constituent elements of the storage control system 600 (e.g., the respective channel control sections or disk control sections) are arranged so as to output trouble occurrence information relating to the occurrence of trouble occurring in these constituent elements, and the SVP 160 can receive this trouble occurrence information. For example, information received by the SVP 160 may include device constructions, power supply alarms, temperature alarms, input-output speeds (e.g., number of I/O requests received by the storage control device 100 per given period of time) and the like. Furthermore, for example, the SVP 160 can perform (for example) the setting of the disk type storage devices 300, the setting of the LDEVs, the installation of micro-programs executed in the channel control sections 110A through 110D and the like in response to operations performed by the operator. Furthermore, for example, the SVP 160 can also perform work such as the confirmation of the operating status of the storage control system 600, specification of trouble locations, installation of operating systems executed by the channel control sections 110 and the like. Moreover, for example, the SVP 160 may be connected to an external maintenance center (not shown in the figures) via a communications network such as a LAN, telephone circuit or the like, and may notify this external maintenance center of trouble occurrence information or the like received from the respective constituent elements of the storage control system 600. Furthermore, the SVP 160 may have a configuration that is contained in the storage control system 600, or a configuration that is externally attached.

The above has been a basic description of the storage control system 600. Furthermore, in this storage control system 600, for example, one channel control section and one disk control section may be integrally constructed as one module, and the functions of the channel control section and disk control section may be manifested by this one module. Furthermore, for example, the SM 120 and CM 130 may be integrally constructed. Furthermore, one LUN may be assigned to each channel control section, or one LUN may be assigned to a plurality of channel control sections. Furthermore, a separate storage control system may be connected to the storage control system 600. In this case, for example, a primary LU possessed by the storage control system 600 and a secondary LU possessed by the separate storage control system may be placed in a paired state, and the host terminals 200A through 200D connected to the storage control system 600 may access the secondary LU inside the separate storage control system via the storage control system 600. Furthermore, for example, the storage control system 600 may be a system that receives both file access requests and block access requests, a system (e.g., NAS) that receives only file access requests, or a system that receives only block access requests.

Figure 3:
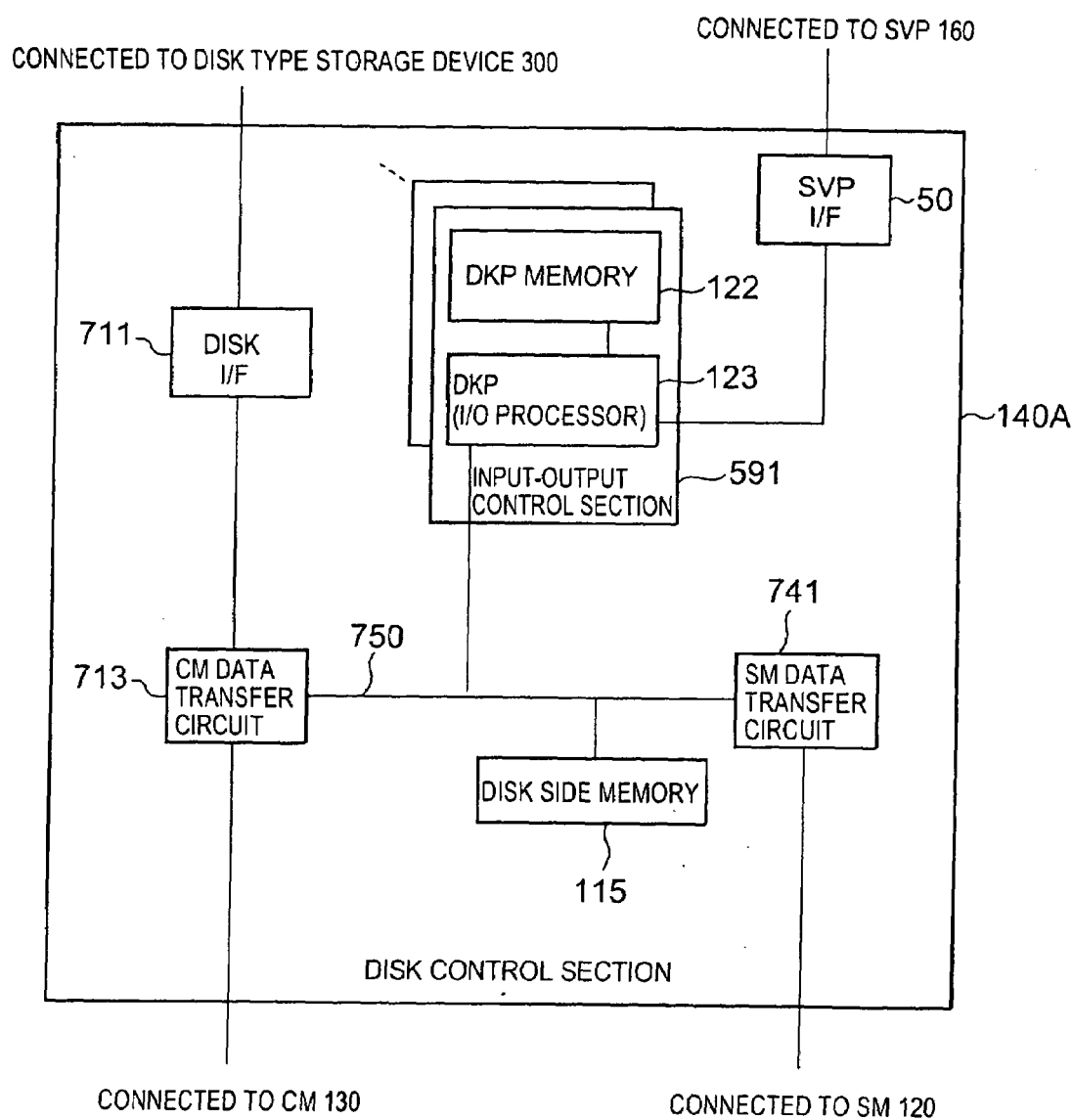
FIG. 3 shows an example of the construction of the disk control section 140A in the present embodiment.

FIG. 3 shows an example of the construction of the disk control section 140A in the present embodiment. The disk control sections 140A through 140D have substantially the same construction; accordingly, the disk control section 140A will be described as a typical example.

The disk control section 140A is formed as a unitized board (e.g., a disk adapter). This disk control section 140A comprises a board connection connector (not shown in the figures), and the disk control section 140A is electrically connected to the storage control device 100 by the engagement of this board connection connector with a specified connector of the storage control device 100. A disk interface part (hereafter abbreviated to "disk I/F") 711, a disk side memory 115, one or a plurality of input-output control sections 591, an SVP interface part (hereafter abbreviated to "SVP I/F") 50, a CM data transfer circuit 713 and an SM data transfer circuit 741 are installed in the disk control section 140A.

The disk I/F 711 is a communications interface which is used to perform communications with the disk type storage devices 300; for example, this I/F is connected to the disk type storage devices 300 via a communications network such as a SAN or the like.

Each of the one or plurality of input-output control sections 591 is a part which controls the processing that is performed on the basis of I/O requests received from the host terminals 200A through 200D; for example, these control sections are micro-processors. For example, a DKP (disk processor) 123 and a DKP memory 122 are installed in each input-output control section 591.

For example, the DKP 123 is a micro-processor; this micro-processor controls the disk control section 140 as a whole, and controls communications with the channel control section 110A through 110D, disk type storage devices 300, and SVP 160. The DKP 123 manifests the functions of the disk control section 140A by executing various types of computer programs stored in the DKP memory 122 (or disk side memory 115). For example, the functions manifested by the disk control section 140A include control of the storage of data in the disk type storage devices 300 and the read-out of such data on the basis of the RAID level, and control of the copying and backup of the data stored in the disk type storage devices 300 and the like.

The DKP memory 122 is a volatile or non-volatile memory (e.g., NVRAM (non-volatile RAM); for example, this memory stores computer programs that control the DKP 123. For example, the contents of the programs stored in the DKP memory 122 can be written or rewritten by instructions from the SVP 160 or a NAS manager 806 (described later).

The SVP I/F 50 is connected to the SVP 160 via a communications network such as an internal LAN 150 or the like, and is also connected to the DKP 123. The SVP I/F 50 is a communications interface (e.g., a LAN controller) which is used to control communications between the SVP 160 and DKP 123.

For example, the CM data transfer circuit 713 receives user data from the CM 130 and transfers this data to the disk side memory 115 via the connection 750, and transfers user data acquired from the disk type storage devices 300 to the CM 130, under the control of the DKP 123. The connection 750 also connects the SM data transfer circuit 741 to the disk side memory 115 and the CM data transfer circuit 713.

For example, the SM data transfer circuit 741 transfers control information for the CHP (channel processors) (e.g., inter-processor messages) from the DKP 123 to the SM 120, and transfers control information received from the SM 120 to the DKP 123, under the control of the DKP 123.

The disk side memory 115 is a volatile or non-volatile memory. For example, information read out from the CM 130 or SM 120 is temporarily stored in the disk side memory 115 by the DKP 123.

Figure 4:
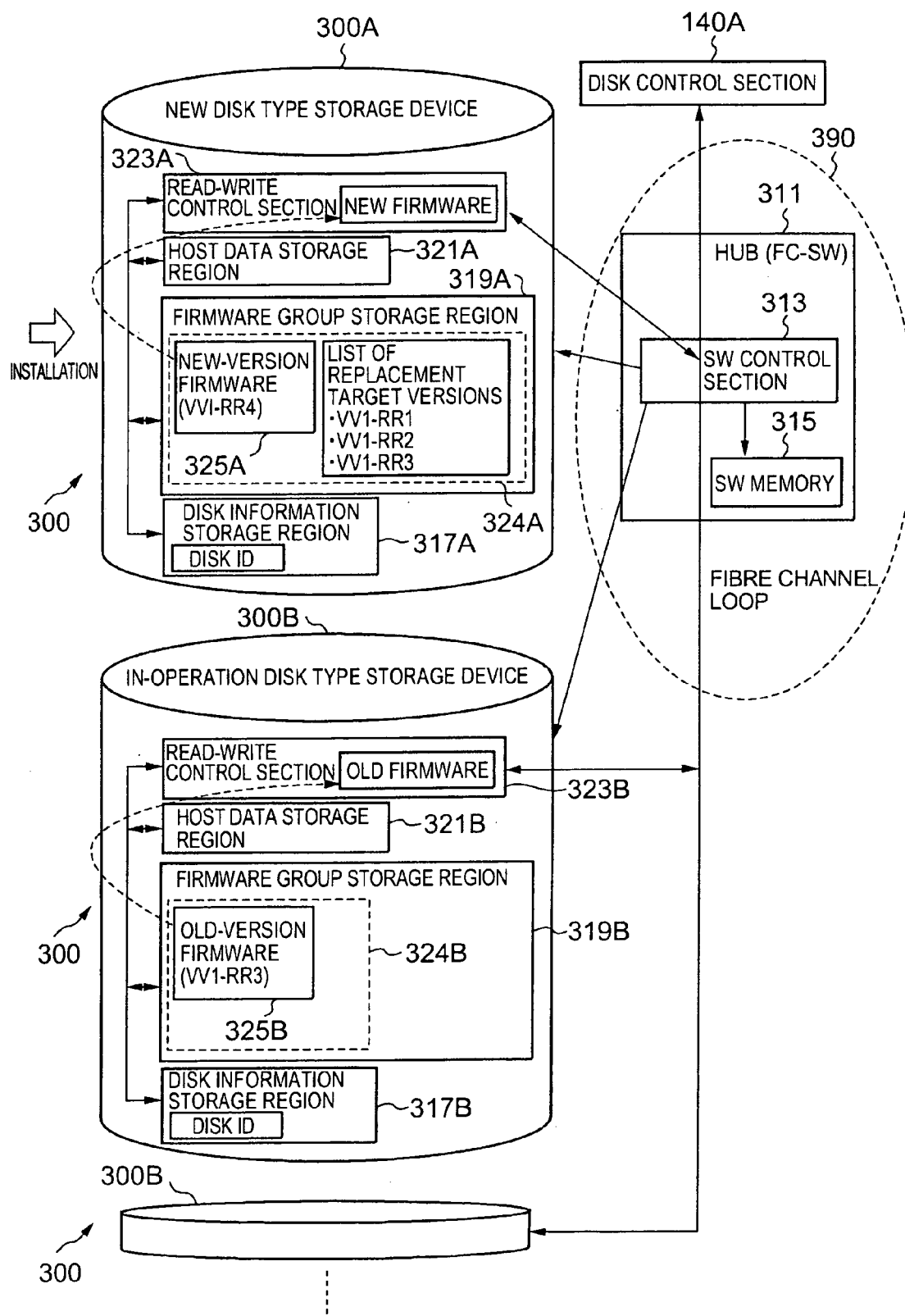
FIG. 4 shows the connection mechanism between one disk control section and a plurality of disk type storage devices.

FIG. 4 shows the connection mechanism between one disk control section and a plurality of disk type storage devices. Furthermore, in this figure, the disk control section 140A (among the disk control sections 140A through 140D) is taken as an example; however, the connection mechanism is also the same for the other disk control sections 140B through 140D.

For example, the disk control section 140A and a plurality of disk type storage devices 300, 300 . . . are connected to one fibre channel loop 390. The disk control section 140A can access the plurality of disk type storage devices 300, 300 . . . that are connected to the same fibre channel loop 390 (i.e., the disk control section 140A can read and write data).

The fibre channel loop 390 contains one or a plurality of hubs (e.g., one fibre channel switch, hereafter indicated as "FC-SW") 311. When one disk control section 140A and a plurality of disk type storage devices 300, 300 . . . are connected to the FC-SW 311, the FC-SW 311 controls communications between the disk control section 140A and the respective disk type storage devices 300.

The FC-SW 311 comprises an SW control section 313, and an SW memory 315. For example, the SW control section 313 is a CPU (central processing unit), and controls the operation of the FC-SW 311 (e.g., communications between the disk control section 140A and the respective disk type storage devices 300). For example, the SW control section 313 monitors whether or not disk type storage devices 300 are installed in specified locations (e.g. locations to which the FC-SW 311 can be electrically connected) of the storage control system 600 (e.g., the basic housing 10 or added housings 12), and writes the results of this monitoring (e.g., the locations where disk type storage devices are installed) into the SW memory (e.g., register) 315.

The plurality of disk type storage devices 300, 300 . . . that are connected to the FC-SW 311 include a disk type storage device (hereafter referred to for convenience as a "new disk type storage device") 300A which has been newly installed in the storage control system 600 (in other words, which has been newly connected to the FC-SW 311), and two or more disk type storage devices (hereafter referred to for convenience as "in-operation disk type storage devices") 300B, 300B . . . which were already installed prior to the new disk type storage device 300A.

The constructions of the new disk type storage device 300A and in-operation disk type storage devices 300B are basically the same. Taking the new disk type storage device 300A as an example, this new disk type storage device 300A comprises a disk information storage region 317A, a firmware group storage region 319A, a host data storage region 321A, and a read-write control section 323A. At least one of the abovementioned storage regions, i.e., the disk information storage region 317A, firmware group storage region 319A and host data storage region 321A, may be disposed on the same storage medium (e.g., hard disk or memory), or these regions may be disposed on separate storage media.

Disk information relating to the new disk type storage device 300A is stored in the disk information storage region 317A. For example, this disk information includes the ID (hereafter referred to as "disk ID") of the new disk type storage device 300A.

A firmware group 324A is stored in the firmware group storage region 319A. For example, firmware that controls the new disk type storage device 300A by being read into the read-write control section 323A is contained in the firmware group 324A. When this firmware is new-version firmware of a new version, a list of replacement target versions 327 in which one or more old versions of firmware that is to be replaced by the new-version firmware are written is also contained in the firmware group 324A. Furthermore, the new-version firmware 325A is firmware of a newer version than the old-version firmware 325B described later. For example, the new-version firmware 325A has auxiliary data and main data. For example, the auxiliary data includes a version code which indicates the version of the firmware (in the example shown in the figure, "VV1-RR4" if the version is the new version, and "VV1-RR3" if the version is the old version), and an installation program which is used to set the new-version firmware 325A in the in-operation disk type storage devices 300B. For example, the main data may include all of the computer programs necessary for operation as new-version firmware 325A, or may include only the portions that differ from the old-version firmware 325B.

Data that is exchanged between the new disk type storage device 300A and the host terminals 200A through 200D (hereafter referred to as "host data") is stored in the host data storage region 321A.

For example, the read-write control section 323A is a fibre channel adapter which is connected to the FC-SW 311 so that communications are possible, and is a circuit board comprising a CPU and a memory. The read-write control section 323A reads out the new-version firmware 325A from the firmware group storage region 319A, and controls the operation of the new disk type storage device 300A in accordance with various program codes contained in this new-version firmware 325A. For example, the read-write control section 323A stores host data received from the host terminals 200A through 200D via the disk control section 140A and FC-SW 311 in the host data storage region 321A, and reads out host data from the host data storage region 321A and transmits this host data to the disk control section 140A via the FC-SW 311. Furthermore, for example, the read-write control section 323A receives firmware group read-out commands from the disk control section 140A, reads out the firmware group 324A from the firmware group storage region 319A, and transfers this firmware group 324A to the disk control section 140A.

Old-version firmware 325B of an older version than the new-version firmware 324A is contained in the firmware group 319B of the in-operation disk type storage devices 300B.

As was described above, version codes that indicate the version of the firmware (in the example shown in the figure, "VV1-RR4" if the version is the new version, and "VV1-RR3" if the version is the old version) are included in both the new-version firmware 325A and old-version firmware 325B. When the version of the firmware is to be distinguished, this version of the firmware can be distinguished by referring to the version codes contained in the firmware. Furthermore, the firmware version codes may also be stored in the disk information storage regions 317A and 317B so that the version of the firmware can be distinguished by accessing these disk information storage regions 317A and 317B.

Figure 5:
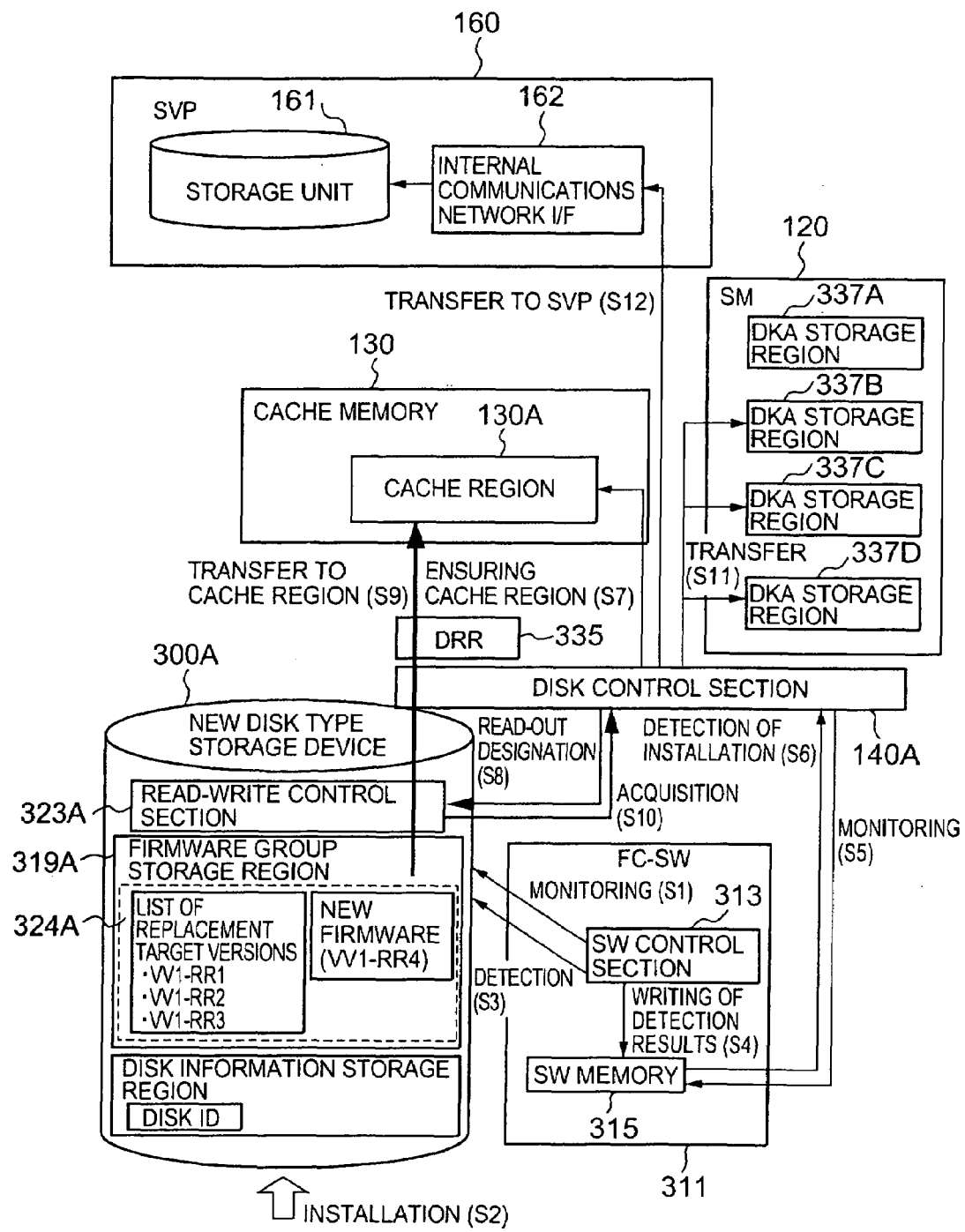
FIG. 5 shows the flow of the firmware group read-out processing that is performed when a disk type storage device 300 is newly installed in the storage control system 600.

FIG. 5 shows the flow of the firmware group read-out processing that is performed when a disk type storage device 300 is newly installed in the storage control system 600.

The SW control section 313 of the FC-SW 311 monitors whether or not a disk type storage device 300 has been installed in a specified location (e.g., a location to which the FC-SW 311 can be electrically connected) of the storage control system 600 (e.g., the basic housing 10 or added housings 12) (step S1).

When a new disk type storage device 300A has been installed in a specified location of the storage control system 600 (S2), the SW control section 313 detects that this new disk type storage device 300A has been electrically connected to the storage control system 600 (S3). The fact that such a new disk type storage device 300A has been installed is written into the SW memory 315 (e.g., a flag is set) (S4).

The disk control section 140A (e.g., the DKP 123 installed in this disk control section) monitors the storage content of the SW memory 315 of the FC-SW 311 (S5).

When it is written into the SW memory 315 that a new disk type storage device 300A has been installed, the disk control section 140A detects this (S6). Subsequently, the firmware group 324A inside the new disk type storage device 300A is read out to at least one of the following: namely, the CM 130, SM 120 and/or SVP 160. This will be described in order below.

(1) Case in which the firmware group 324A inside the new disk type storage device 300A is read out to the CM 130:

The disk control section 140A ensures a temporary buffer region (hereafter referred to as a "cache region") 130A in the CM 130 (S7), and sends a firmware group read-out instruction to the new disk type storage device 300A (S8).

In response to the firmware group read-out instruction from the disk control section 140A, the read-write control section 323A of the new disk type storage device 300A reads out the firmware group 324A from the firmware group storage region 319A, and transfers this firmware group 324A to the cache region ensured in S7 via the disk control section 140A and DRR (data regeneration) circuit 335 (S9).

As a result of the processing flow of the abovementioned S7 through S9, the firmware group 324A inside the new disk type storage device 300A is read out to the CM 130.

(2) Case in which the firmware group 324A inside the new disk type storage device 300A is read out to the SM 120:

A plurality of DKA storage regions 337A through 337D respectively corresponding to the plurality of disk control sections 140A through 140D are prepared in the SM 120.

Each DKA storage region 337A through 337D is periodically accessed by the corresponding disk control section. Furthermore, although this is not shown in the figures, one or a plurality of DKP polling regions respectively corresponding to the one or plurality of DKPs 123 installed in the disk control section corresponding to the DKA storage region in question are prepared in each of the DKA storage regions 337A through 337D.

The DKP 123 of the disk control section 140A sends a firmware group read-out instruction to the new disk type storage device 300A (S8), and the firmware group 324A that is acquired in response to this instruction (S10) is stored in the DKA storage regions 337B through 337D corresponding to the other disk control sections 140B through 140D (S11).

As result of the processing flow of the abovementioned S8 and S10 through S11, the firmware group 324A inside the new disk type storage device 300A is read out to the SM 120.

(3) Case in which the firmware group 324A inside the new disk type storage device 300A is read out to the SVP 160:

The DKP 123 of the disk control section 140A sends a firmware group read-out instruction to the new disk type storage device 300A (S8), and the firmware group 324A that is acquired in response to this instruction (S10) is transmitted to the SVP 160 via an internal communications network (e.g., LAN) 151. The firmware group 324A that is transmitted to the SVP 160 is stored in the storage unit (e.g., hard disk or memory) 161 of the SVP 160 via the internal communications network interface 162 of the SVP 160.

As a result of the processing flow of the abovementioned S8, S10 and S12, the firmware group 324A inside the new disk type storage device 300A is read out to the SVP 160.

After the firmware group 324A inside the disk type storage device 300A has been read out to at least one of the abovementioned parts, i.e., the CM 130, SM 120 and/or SVP 160, the old-version firmware 325B inside the in-operation disk type storage devices 300B is updated to the new-version firmware 325A by the processing flow described below. This processing flow will be described below using a case in which the firmware of in-operation disk type storage devices 300B connected to the same fibre channel loop 390 as the disk control section 140C is updated as an example (the processing flow described below is the same for the other disk control sections 140A through 140B and 140D).

Figure 6:
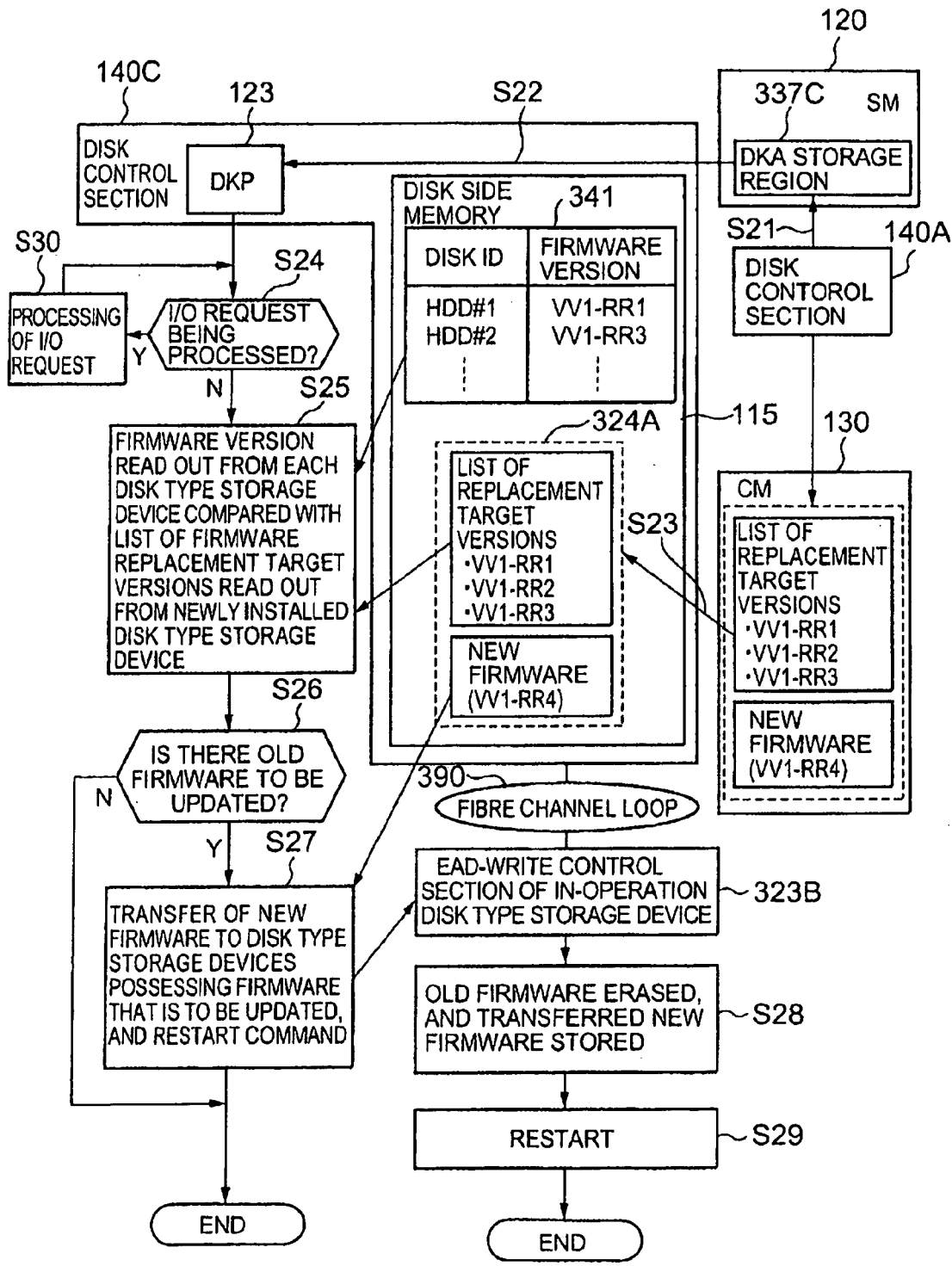
FIG. 6 shows the flow of the firmware updating processing that is performed when the firmware group 324A in the new disk type storage device 300A is read out to the CM 130.

(1) Case in which the firmware group 324A inside the new disk type storage device 300A is read out to the CM 130:

FIG. 6 shows the firmware updating processing flow that is performed in a case in which the firmware group 324A inside the new disk type storage device 300A is read out to the CM 130.

Disk device information 341 relating to two or more disk type storage devices 300 connected to the same fibre channel loop 390 as the channel control section 140C is stored in the disk side memory 115 (or DKP memory 122) of the channel control section 140C. For example, this disk device information 341 includes two or more disk IDs and firmware versions respectively corresponding to the abovementioned two or more disk type storage devices 300. The disk device information 341 may be registered beforehand by the user using the SVP 160 or the like, or may be automatically acquired by the DKP 123 of the disk control section 140C. In the latter case, for example, the DKP 123 transmits an inquiry command based on the SCSI protocol to the two or more disk type storage devices 300, and registers the disk device information 341 in the disk side memory 115 on the basis of the two or more disk IDs and firmware versions respectively received from the two or more disk type storage devices 300 in response to this inquiry command.

After the firmware group 324A has bee read out to the CM 130, the disk control section 140A stores a firmware updating command in the DKA storage region 337C (storage region in the SM 120) corresponding to the disk control section 140C (S21).

When the DKP 123 of the disk control section 140C acquires a firmware updating command from the DKA storage region 337C (S22), the DKP 123 reads out the firmware group 324A from the cache region 130A ensured in the CM 130, and registers this firmware group 324A in the disk side memory 115 (S23).

When the DKP 123 is not engaged in the processing of an I/O request from the host terminals 200A through 200D (N in S24), the DKP 123 compares two or more old-version firmware versions respectively corresponding to two or more in-operation disk type storage devices 300B connected to the same fibre channel loop 390 (the two or more old-version firmware versions registered in the disk side memory 115) and one or more old-version firmware versions described in the list of replacement target versions 327 contained in the firmware group 324A (hereafter referred to as "old versions described in the list") (S25).

When at least one of the two or more old-version firmware versions matches (e.g., coincides with) at least one of the one or more old versions described in the list as a result of S25 (Y in S26), the DKP 123 transfers the new-version firmware 325A in the disk side memory 115 to the in-operation disk type storage devices 300B having a disk ID corresponding to the old-version firmware versions, and also issues a restart command (S27).

The read-write control section 323B of each in-operation disk type storage device 300B that has received the new-version firmware 325A erases the old-version firmware 325B in the firmware group storage region 319B, and stores the received new-version firmware 325A (S28) in the storage region 319. Subsequently, in accordance with the restart command from the DKP 123, the read-write control section 323B executes restarting (S29). As a result, the new-version firmware 325A in the firmware group storage region 319B is read into the read-write control section 323B, and the operation of the corresponding in-operation disk type storage device 300B is controlled by this new-version firmware 325A.

Furthermore, in the abovementioned processing flow, if the DKP 123 is engaged in the processing of an I/O request in S24 (e.g., if host data is being stored in the in-operation disk type storage device 300B or if host data is being read out from the in-operation disk type storage device 300B) (Y in S24), S25 is not initiated, and the processing of the I/O request is preferentially performed (S30). After this processing has been completed (after N is obtained in S24), the DKP 123 executes S25.

Figure 7:
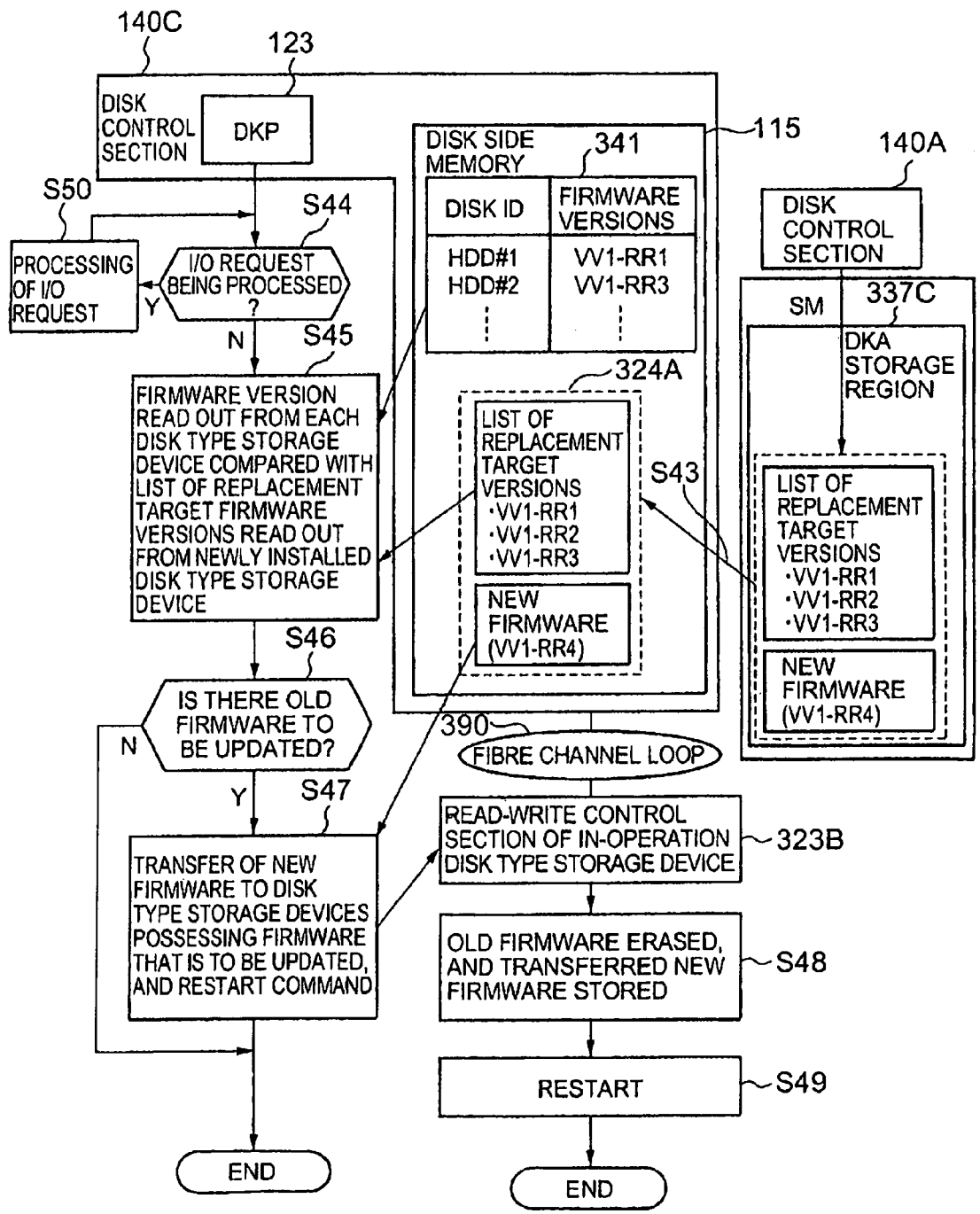
FIG. 7 shows the flow of the firmware updating processing that is performed when the firmware group 324A in the new disk type storage device 300A is read out to the SM 120.

(2) Case in which the firmware group 324A inside the new disk type storage device 300A is read out to the SM 120:

FIG. 7 shows the firmware updating processing flow that is performed in a case where the firmware group 324A inside the new disk type storage device 300A is read out to the SM 120. For the most part, points of difference between this processing flow and the firmware updating processing flow that is performed when the firmware group 324A is read out to the CM 130 will be described below; points that are common to both processing flows will be simplified or omitted in order to avoid a redundant description.

When the DKP 123 of the disk control section 140C has acquired a firmware updating command from the DKA storage region 337C, the firmware group 324A is read out from this DKA storage region 337C, and this firmware group 324A is registered in the disk side memory 115 (S43).

Subsequently, the processing of the abovementioned S24 through S30 is performed (S44 through S50).

Figure 8:
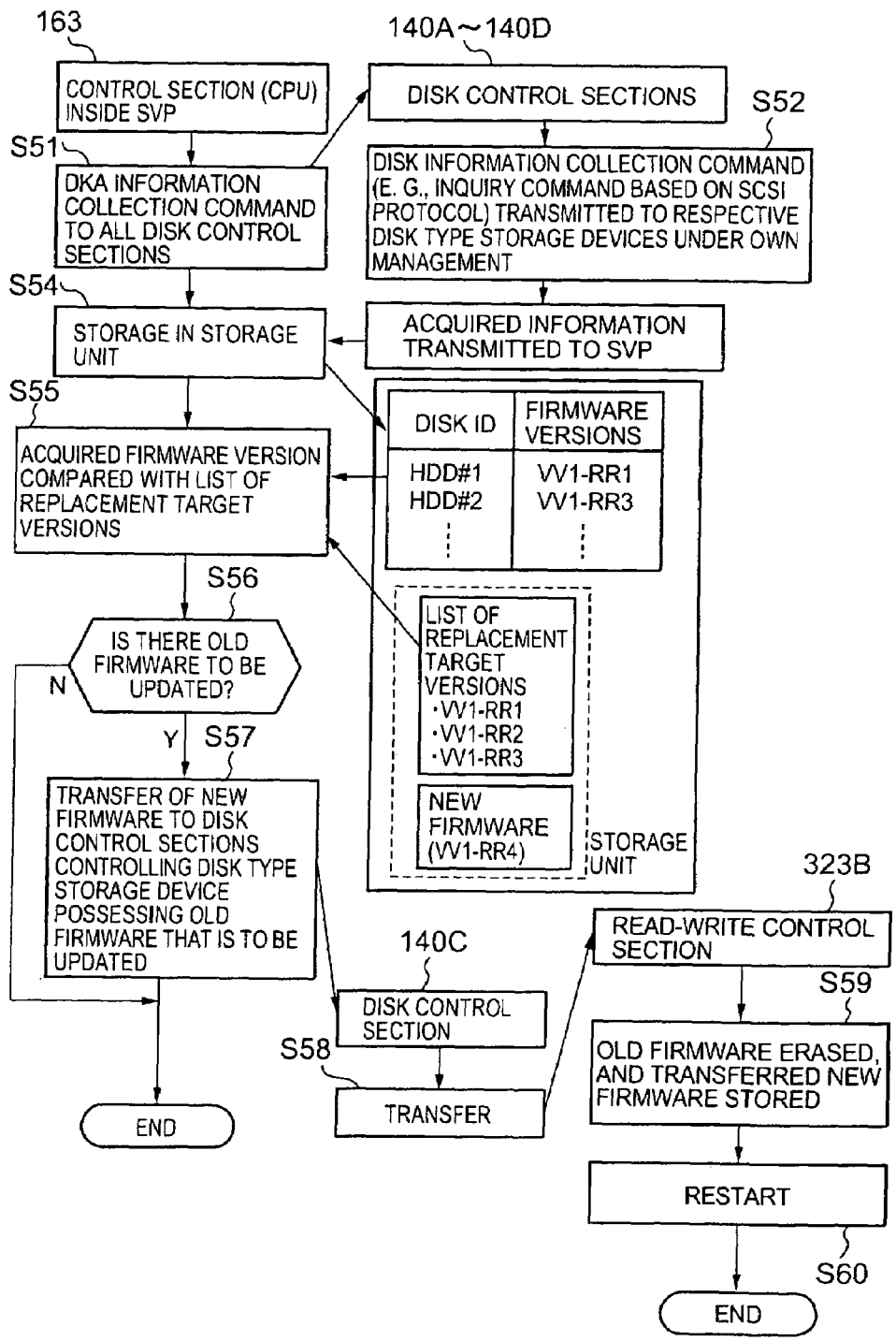
FIG. 8 shows the flow of the firmware updating processing that is performed when the firmware group 324A in the new disk type storage device 300A is read out to the SVP 160.

(3) Case in which the firmware group 324A inside the new disk type storage device 300A is read out to the SVP 160:

FIG. 8 shows the firmware updating processing flow that is performed when the firmware group 324A inside the new disk type storage device 300A is read out to the SVP 160.

The control section (e.g., CPU) 163 inside the SVP 160 transmits DKA information collection commands to all of the disk control sections 140A through 140D at a specified timing (e.g., when a command is received from the user, or when the system is started) (S51).

Each of the disk control sections 140A through 140D receiving a DKA information collection command from the SVP 160 transmits a disk information collection command (e.g., an inquiry command based on the SCSI protocol) to the respective disk type storage devices 300 under its own control (e.g., disk type storage devices 300 which are connected to the same fibre channel loop 390) (S52). The read-write control section 323A or 323B of each disk type storage device 300 that receives a disk information collection command acquires the disk ID and firmware version of the corresponding disk type storage device 300, and transmits the acquired disk ID and firmware version to the disk control sections connected to the same fibre channel loop 390. The disk control sections 140A through 140D transmit the acquired disk ID and firmware version to the SVP 160 (S53).

The control section 163 of the SVP 160 stores the acquired disk ID and firmware version in the storage unit (e.g., memory or hard disk) 161 (S54). As a result, for example, a plurality of disk IDs and firmware versions respectively corresponding to the plurality of disk type storage devices 300 installed in the storage control system 600 are registered in the storage unit 161 as shown in the figure. Furthermore, the control section 163 may also display a list of the received disk IDs and firmware versions on the display screen of the SVP 160.

The control section 163 compares the plurality of firmware versions contained in the disk device information 341 registered in the storage unit 161 with the one or more listed old versions described in the list of replacement target versions 327 contained in the firmware group 324A (S55).

When at least one of the plurality of firmware versions matches (e.g., coincides with) one or more of the old versions described in the list as a result of S55 (Y in S56), the control section 163 transfers the disk ID of the in-operation disk type storage device 300B which has the old-version firmware version and the new-version firmware 325A registered in the storage unit 161 to the disk control section (e.g., 140C) that controls this in-operation disk type storage device 300B (S57).

The disk control section 140C transfers the new-version firmware 325A received from the SVP 160 to the in-operation disk type storage device 300B that has the received disk ID (s58).

The read-write control section 323B of the in-operation disk type storage device 300B that has received the new-version firmware 325A performs the processing of the abovementioned S28 and S29 (S59 and S60).

Thus, in the embodiment described above, the mere installation of a new disk type storage device 300A which has the new-version firmware 325A and list of replacement target versions 324A in the storage control system 600 results in the firmware 325B of a listed old version (e.g., "VV1-RR3") that is written in the list of replacement target versions 324A (among the plurality of sets of firmware respectively corresponding to the plurality of in-operation disk type storage devices 300B) automatically being updated to the new-version firmware 325A. To describe this more abstractly, the new-version firmware 325A is read out from the newly installed disk type storage device 300A, and the old-version firmware inside the in-operation disk type storage devices 300B that have already been installed is updated to this read-out new-version firmware 325A. As a result, the firmware of the in-operation disk type storage devices 300B can be efficiently updated (e.g., along with the replacement of malfunctioning disk type storage devices by new disk type storage devices). Furthermore, in the abovementioned embodiment, since the old-version firmware is updated to the new-version firmware merely by installing the disk type storage device 300A, there is no need for the separate processing of the updating of the firmware of a reference disk to the new-version firmware as in Japanese Patent Application Laid-Open No. 11-134114.

Furthermore, compared to the firmware updating processing of the abovementioned (3) (i.e., processing in which the new-version firmware 325A is stored in the in-operation disk type storage devices 300B from the new disk type storage device 300A via the SVP 160), the firmware updating processing of the abovementioned (1) or (2) (i.e., processing in which the new-version firmware 325A is stored in the in-operation disk type storage devices 300B from the new disk type storage device 300A via the CM 130 or SM 120) would appear to be more efficient. The reason for this is as follows: namely, the firmware updating processing of (3) requires a human being to operate the SVP 160; furthermore, there may be cases in which firmware updating processing cannot be performed after the use of the new disk type storage device 300A is initiated, unless approval is first obtained from the user using this new disk type storage device 300A. On the other hand, the firmware updating processing of (1) or (2) is performed automatically when a new disk type storage device 300A is installed; accordingly, there is no trouble of the type encountered in the firmware updating processing of (3).

Several modifications are conceivable in this embodiment. A number of such modifications will be described below. Furthermore, in the following description, points of difference from the abovementioned embodiment will be described for the most part; points that are common to the embodiment and modifications will be omitted or abbreviated in order to avoid redundant descriptions.

(A) First Modification

Figure 9:
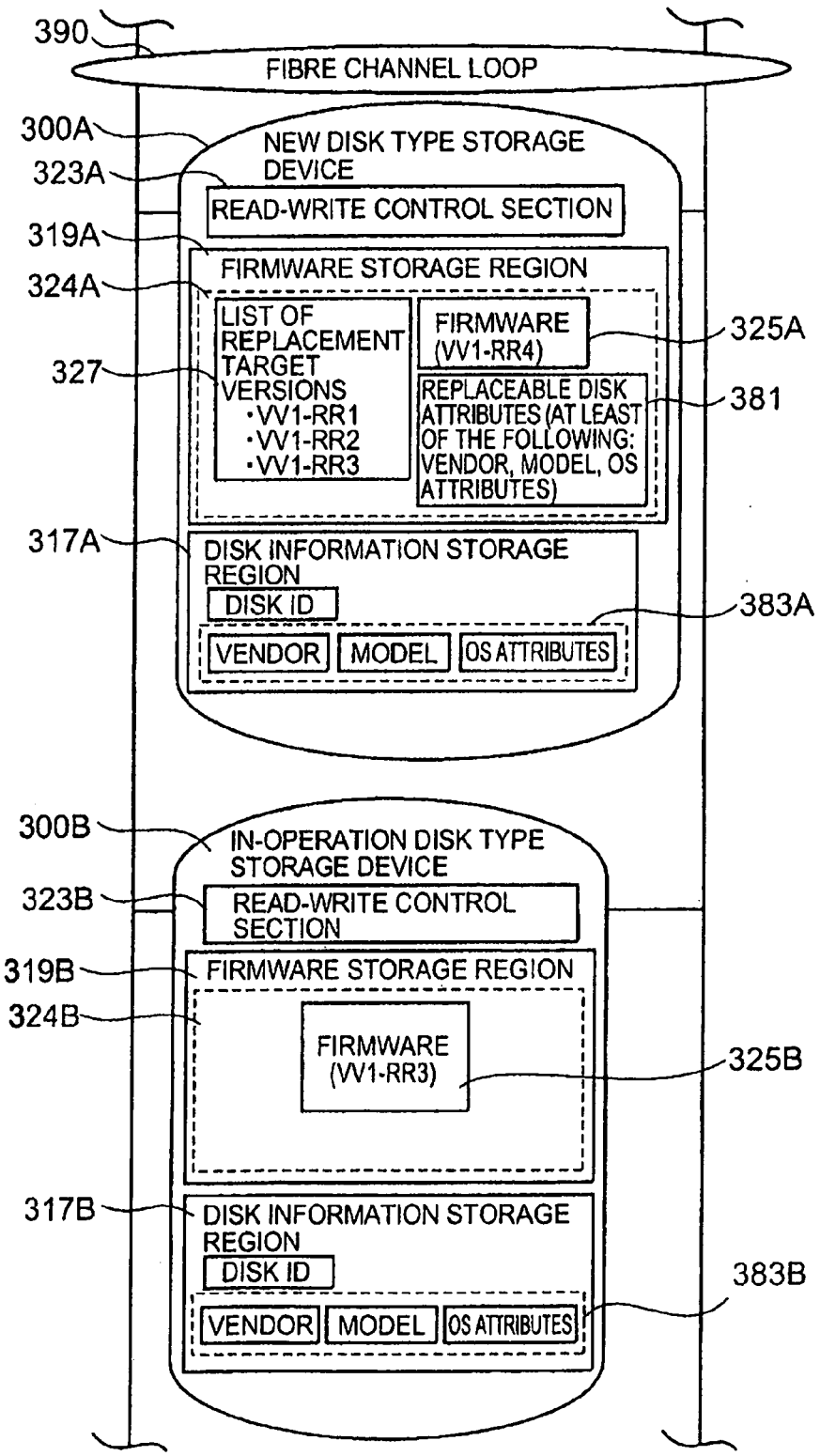
FIG. 9 shows the construction of the disk type storage devices in a first modification of the present embodiment.

FIG. 9 shows the construction of a disk type storage device in a first modification of the present embodiment.

For example, disk attribute information 383B relating to an in-operation disk type storage device 300B is stored in the disk information storage region 317B of this in-operation disk type storage device 300B. For example, this disk attribute information 383B includes at least one type of information selected from a set comprising the vendor (or maker) of the disk type storage device 300B, the model of the device and the OS attributes of the device (e.g., type or version of OS).

Furthermore, for example, disk attribute information 383A relating to a new disk type storage device 300A is stored in the disk information storage region 317A of this new disk type storage device 300A. For example, this disk attribute information 383A includes at least one type of information selected from a set comprising the vendor (or maker) of the disk type storage device 300A, the model of the device and the OS attributes of the device (e.g., type or version of OS).

Furthermore, a replaceable disk attribute information group (hereafter referred to as an "attribute group") 381 is contained in the firmware group 324A of the new disk type storage device 300A. This attribute group 381 includes one or more types of disk attribute information relating to disk type storage devices 300 in which the new-version firmware 325A can operate. The respective sets of disk attribute information include at least one type of information selected from a set comprising the vendor (or maker) of the disk type storage device 300 having this information, the model of the device and the OS attributes of the device.

The processing flow in a case where the old-version firmware 325B is updated to the new-version firmware 325A in this first modification will be described below.

Figure 10:
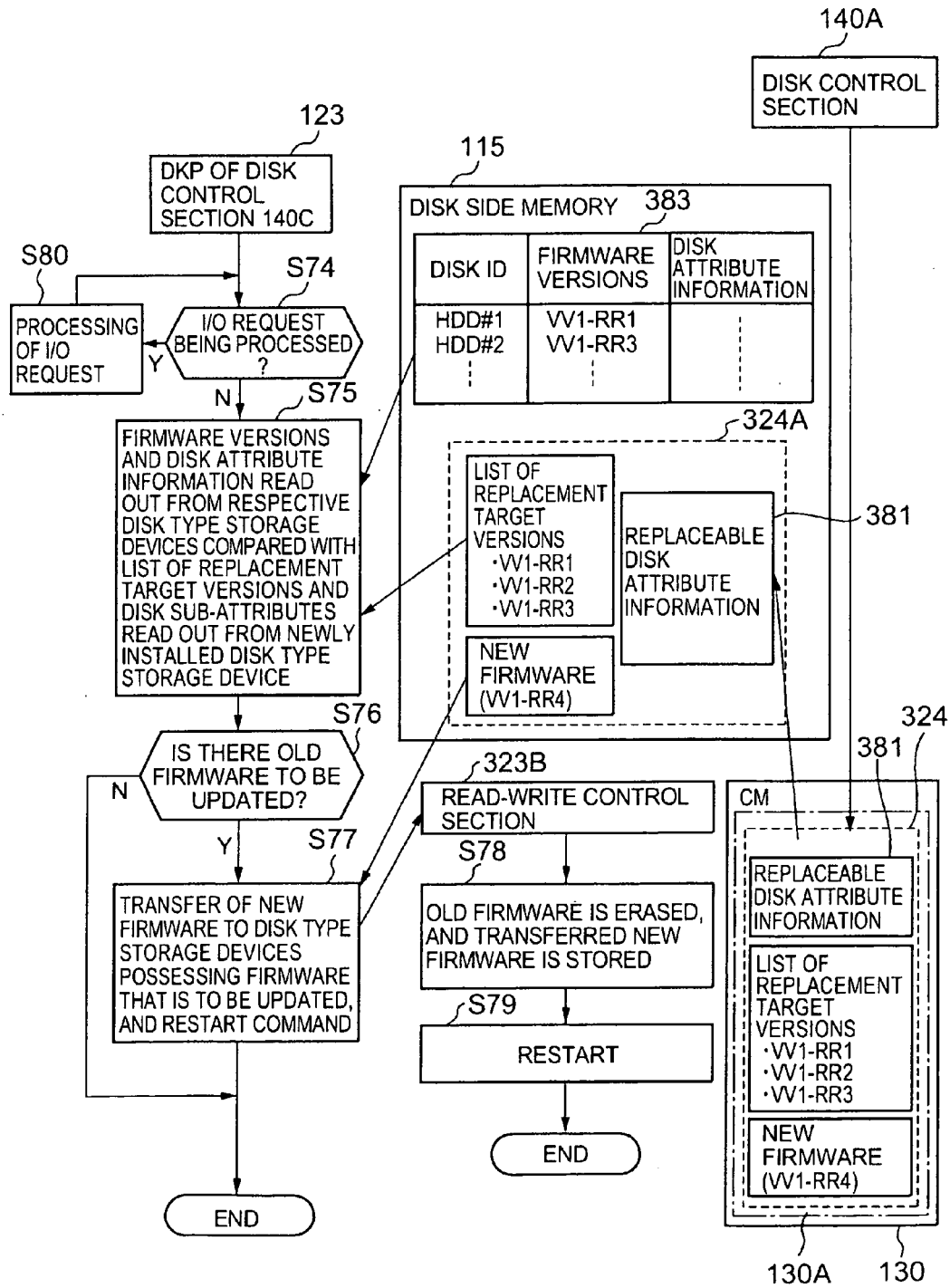
FIG. 10 shows the flow of the firmware updating processing that is performed when the firmware group 324A in the new disk type storage device 300A is read out to the CM 130 in the first modification of the present embodiment.

(A-1) Case in which the firmware 324A inside the new disk type storage device 300A is read out to the CM 130:

FIG. 10 shows the flow of the firmware updating processing that is performed in a case where the firmware group 324A inside the new disk type storage device 300A is read out to the CM 130 in a first modification of the present embodiment.

Since the firmware group 324A is read out to the cache region 130A ensured in the CM 130, an attribute group 381 is stored in this cache region 130A.

Disk device information 383 relating to two or more disk type storage devices 300 connected to the same fibre channel loop 390 as the channel control section 140C is stored in the disk side memory 115 (or DKP memory 122) of the channel control section 140C. For example, this disk device information 383 includes two or more disk IDs, firmware versions and disk attribute information (at least one type of information selected from a set comprising the vendor, model and OS attributes of the disk type storage device) respectively corresponding to these two or more disk type storage devices 300. This disk device information 383 may be registered beforehand by the user using the SVP 160 or the like, or may be automatically acquired by the DKP 123 of the disk control section 140C. In the latter case, for example, the DKP 123 transmits inquiry commands based on the SCSI protocol to the two or more disk type storage devices 300, and registers the disk device information 383 in the disk side memory 115 on the basis of the two or more disk IDs, firmware versions and disk attribute information respectively received from the two or more disk type storage devices 300 in response to these commands.

When the DKP 123 of the disk control section 140C acquires a firmware updating command from the DKA storage region 337C of the SM 120, the DKP 123 reads out the firmware group 324A from the cache region 130A ensured in the CM 130, and registers this firmware group 324A in the disk side memory 115 (S73).

When the DKP 123 is not engaged in the processing of an I/O request from the host terminals 200A through 200D (N in S74), the DKP 123 compares two or more old-version firmware versions respectively corresponding to the two or more in-operation disk type storage devices 300B connected to the same fibre channel loop 390 as the disk control section 140C (i.e., the two or more old-version firmware versions registered in the disk side memory 115) with one or more listed old versions described in the list of replacement target versions 327 contained in the firmware group 324A. At the same time, furthermore, the DKP 123 compares two or more sets of disk attribute information respectively corresponding to the abovementioned two or more in-operation disk type storage devices 300B (i.e., the two or more sets of disk attribute information registered in the disk side memory 115) with the one or more sets of disk attribute information contained in the attribute group 381 (S25).

Figure 11:
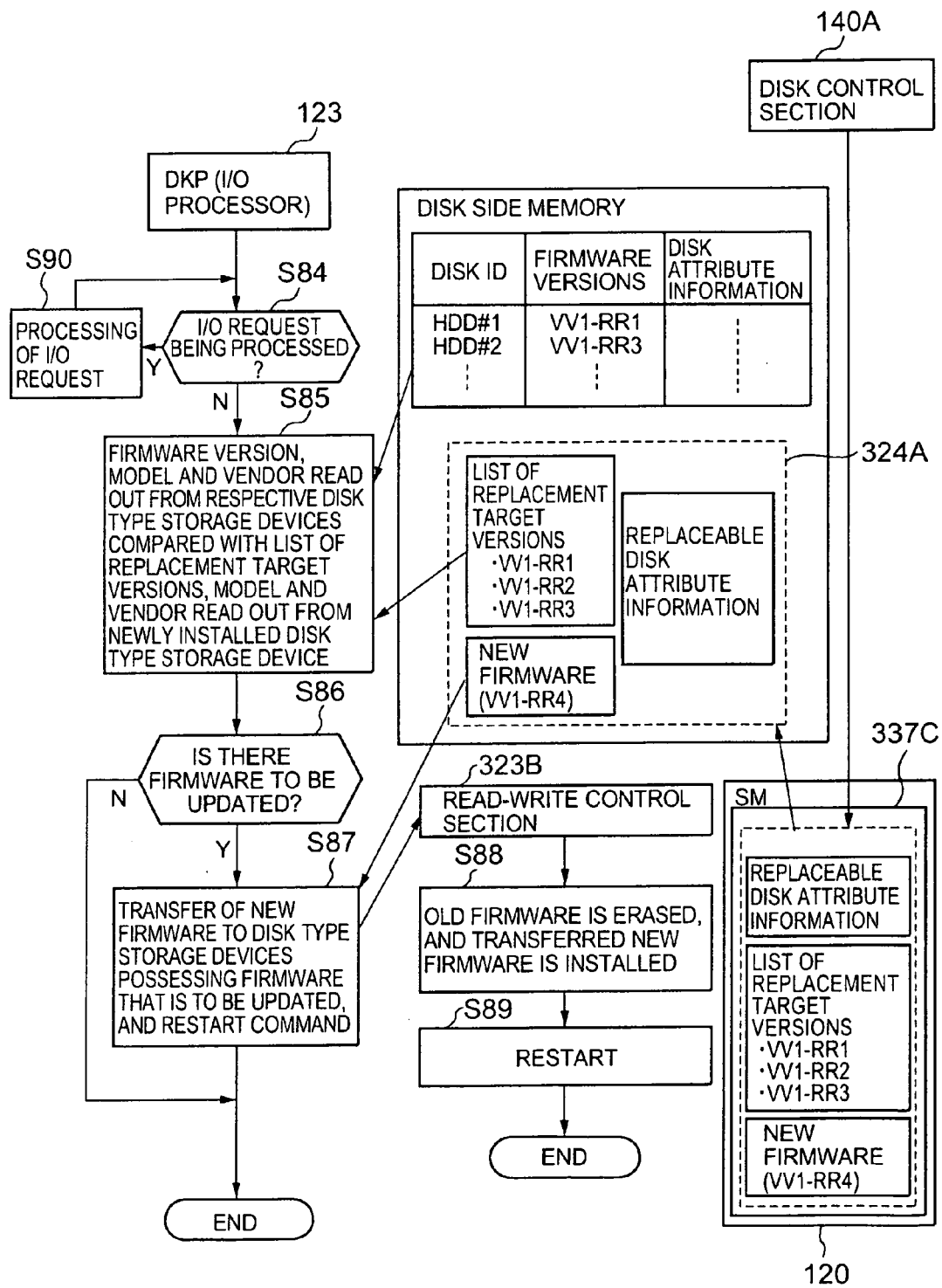
FIG. 11 shows the flow of the firmware updating processing that is performed when the firmware group 324A in the new disk type storage device 300A is read out to the SM 120 in the first modification of the present embodiment.

When (as a result of S25) at least one of the two or more old-version firmware versions matches at least one of the one or more listed old versions, and the disk attribute information of the disk type storage devices 300 having this matching old-version firmware matches at least one of the one or more sets of disk attribute information contained in the attribute group 381 (Y in S26), the processing of the abovementioned S27 through S29 is performed (S77 through S79). (A-2) Case in which the firmware 324A inside the new disk type storage device 300A is read out to the SM 120:

FIG. 11 shows the flow of the firmware updating processing that is performed in a case in which the firmware group 324A inside the new disk type storage device 300A is read out to the SM 120 in a first modification of the present embodiment. For the most part, points of difference between this firmware updating processing and the flow of the firmware updating processing of (A-1) will be described below; points that are common to both processing flows will be abbreviated or omitted in order to avoid redundant descriptions.

When the DKP 123 of the disk control section 140C acquires a firmware updating command from the DKA storage region 337C, the DKP 123 reads out the firmware group 324A from the DKA storage region 337C, and registers this firmware group 324A in the disk side memory 115 (S43).

Subsequently, the processing of the abovementioned S74 through S80 is performed (S84 through S90).

Figure 12:
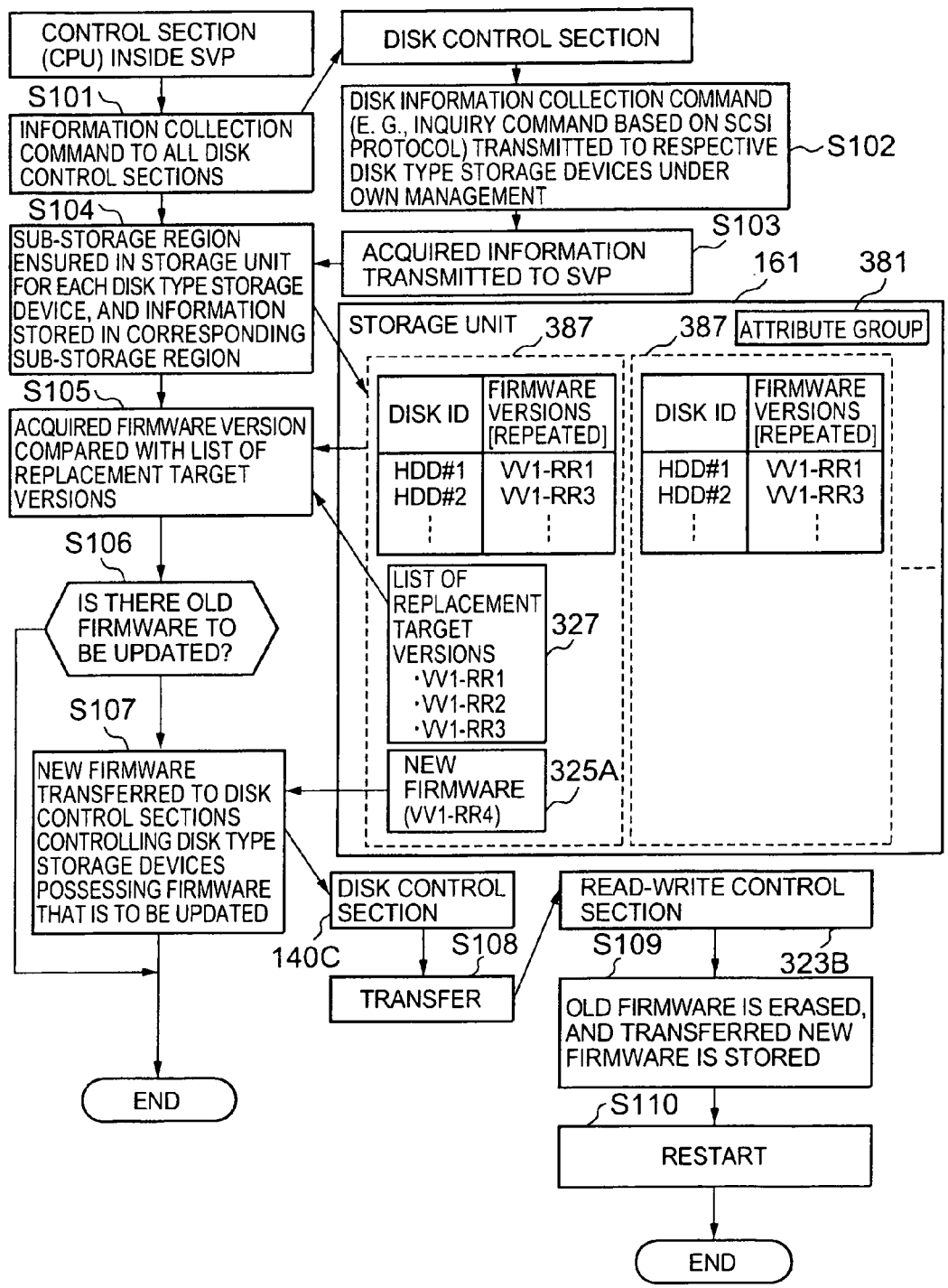
FIG. 12 shows the flow of the firmware updating processing that is performed when the firmware group 324A in the new disk type storage device 300A is read out to the SVP 160 in the first modification of the present embodiment.

(A-3) Case in which the firmware 324A inside the new disk type storage device 300A is read out to the SVP 160:

FIG. 12 shows the flow of the firmware updating processing that is performed in a case in which the firmware group 324A inside the new disk type storage device 300A is read out to the SVP 160 in a first modification of the present embodiment.

The processing of the abovementioned S51 through S52 is performed (S101 through S102). The read-write control section 323A or 323B of each disk type storage device 300 that has received a disk information collection command acquires the disk ID, firmware version and disk attribute information of the corresponding disk type storage device 300, and transmits the acquired disk IDs, firmware versions and disk attribute information to the disk control section connected to the same fibre channel loop 390. The disk control sections 140A through 140D transmit the acquired disk IDs, firmware versions and disk attribute information to the SVP 160 (S103).

The control section 163 of the SVP 160 ensures, on the storage unit 161, sub-storage regions 387, 387 . . . for each of the respective received sets of disk attribute information. Furthermore, the control section 163 registers the disk IDs and firmware versions of one or more disk type storage devices that have the abovementioned disk attribute information (e.g., at least one type of information selected from a set comprising the vendor, model and OS attributes of the disk type storage device) in the sub-storage regions 387 for the respective sets of disk attribute information. Moreover, the control section 163 compares the respective sets of disk attribute information with the one or more sets of disk attribute information contained in the attribute group 381, and if the information matches, the list of replacement target versions 327 and the new-version firmware 325A are stored in the one or more sub-storage regions 387 corresponding to the disk attribute information that showed a match (S104).

Next, for the sub-storage regions 387 storing the list of replacement target versions 327 and the new-version firmware 325A, the control section 163 compares the one or more old versions registered in the sub-storage regions 387 with the one or more listed old versions (S105).

When at least one of the one or more old versions matches at least one of the one or more listed old versions as a result of S105 (Y in S56), the processing of the abovementioned S57 through S60 is performed (S107 through S110).

Furthermore, the control section 163 may distinguish the old-version update target firmware and the disk type storage devices 300B in which this firmware is stored by a method other than the preparation of sub-storage regions 387 for each set of disk attribute information in the storage unit 161. For example, the control section 163 may make such a distinction by a method similar to that used by the DKP 123 of the disk control section 140C in (A-1) or (A-2).

Thus, in the abovementioned first modification, the storage or non-storage of the new-version firmware 325A in the in-operation disk type storage devices 300B is controlled not only in accordance with the type of the old version, but also in accordance with the type of the disk attribute information of the in-operation disk type storage devices 300B. As a result, even if a plurality of disk type storage devices 300 with different types of disk attribute information (e.g., at least one type of information selected from a set comprising the vendor, model and OS attributes) are mixed together in the storage control system 600, the new-version firmware 325A can be appropriately installed in the in-operation disk type storage devices 300B.

(B) Second Modification

Figure 13:
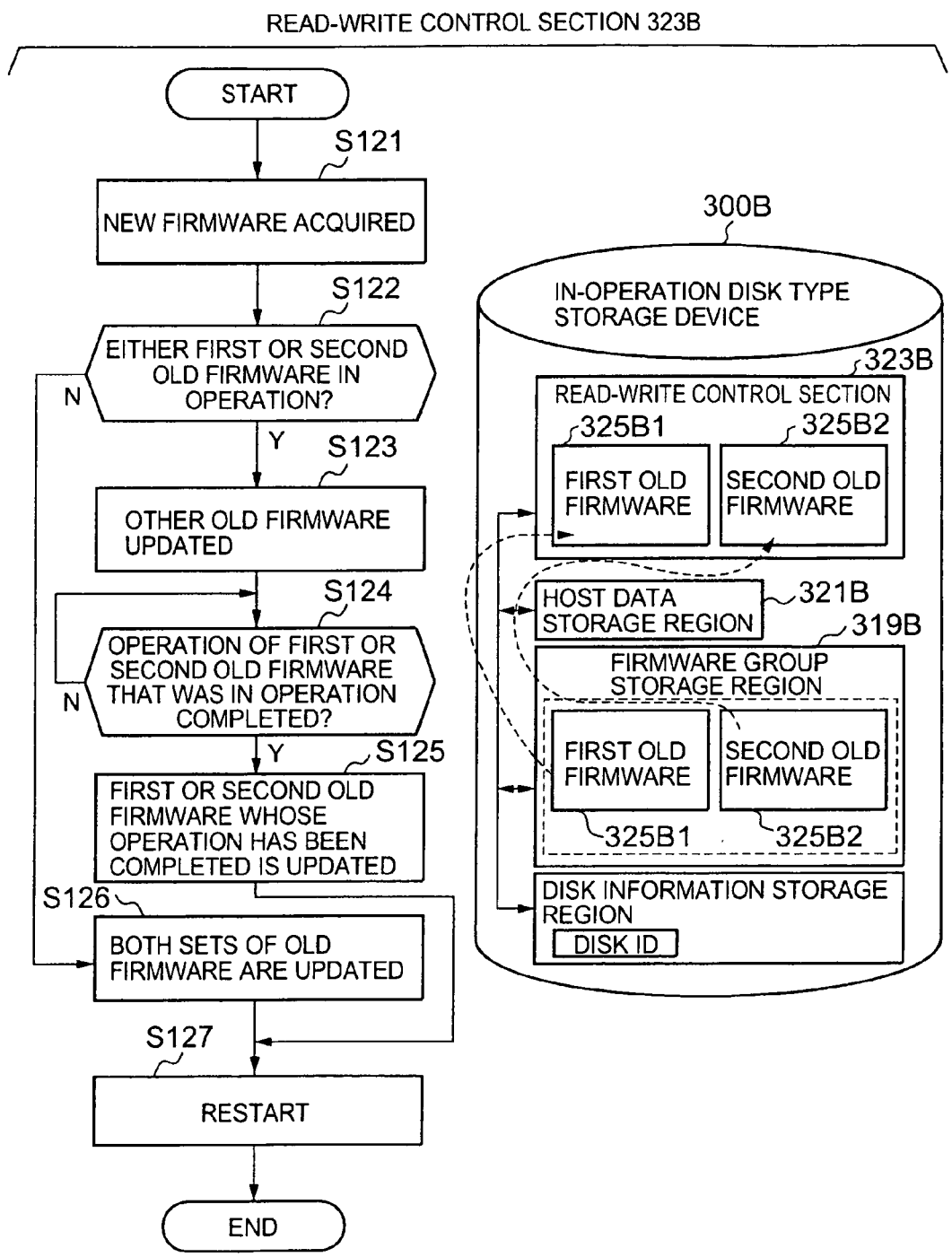
FIG. 13 shows the construction of the in-operation disk type storage device 300B in a second modification of the present embodiment, and the flow of the processing that is performed by the read-write control section 323B of this in-operation disk type storage device 300B.

FIG. 13 shows the construction of the in-operation disk type storage devices 300B in a second modification of the present embodiment, and the flow of the processing performed by the read-write control section 323B of each of these in-operation disk type storage devices 300B.

In this second modification, the old-version firmware is multiplexed (e.g., duplexed), so that even if one set of old-version firmware cannot operate, the in-operation disk type storage device 300B in question can operate by the operation of a separate set of old-version firmware.

A plurality of sets of old-version firmware, e.g., a first set of old-version firmware 325B1 and a second set of old-version firmware 325B2, are present in the read-write control section 323B of at least one of the plurality of disk type storage devices 300B. These sets of old-version firmware may be sets of firmware obtained by respectively reading out two sets of old-version firmware 325B1 and 325B2 stored in the firmware group storage region 319B as shown in the figure, or sets of firmware obtained from one set of firmware 325B (although this is not shown in the figures).

For example, when the first set of old-version firmware 325B1 cannot operate, the read-write control section 323B can operate using the second set of old-version firmware 325B2.

When the new-version firmware 325A is transferred to such an in-operation disk type storage device 300B, the read-write control section 323B of this storage device 300B operates as follows:

Specifically, when the read-write control section 323B acquires new-version firmware (S121), if the first set of old-version firmware 325B1 is in operation (e.g., engaged in the processing of an I/O request) (Y in S122), the second set of old-version firmware 325B2 that is not in operation (i.e., the second set of old-version firmware 325B2 in the firmware group storage region 319B) is updated to the new-version firmware 325A (S123). Then, when the operation of the first set of old-version firmware 325B1 is completed (Y in S124), the read-write control section 323B also updates this first set of old-version firmware 325B1 (i.e., the first set of old-version firmware 325B1 in the firmware group storage region 319B) to the new-version firmware 325A (S125).

In step S122, if neither of the first and second sets of old-version firmware 325B1 and 325B2 is in operation (N in S122), the read-write control section 323B updates both the first and second sets of old-version firmware 325B1 and 325B2 on the firmware group storage region 319B to the new-version firmware 325A (S126).

Following S125 or S126, the read-write control section 323B executes restarting (S127). As a result, the two sets of firmware used by the read-write control section 323B are both the new-version firmware 325A.

In this second modification, even if at least one of the duplexed sets of old-version firmware is in operation, the old-version firmware can be updated to the new-version firmware without hindering the operation of the old-version firmware.

Furthermore, in this second modification, when (for example) the two sets of old-version firmware 325B1 and 325B2 of the read-write control section 323B are produced from a single set of old-version firmware, one set of the old-version firmware in the firmware group storage region 319B may be updated to the new-version firmware 325A if one or both of the two sets of old-version firmware 325B1 and 325B2 are out of operation.

(C) Third Modification

Figure 14:
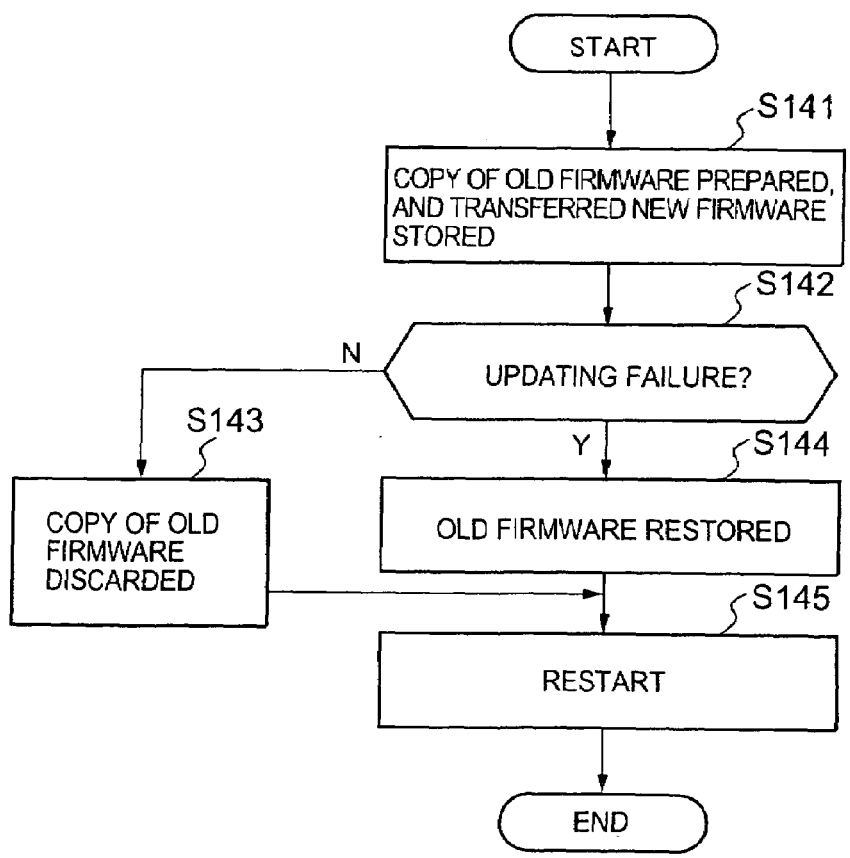
FIG. 14 shows the flow of the processing performed by the read-write control section 323B in a third modification of the present embodiment.

FIG. 14 shows the processing flow of the read-write control section 323B in a third modification of the present embodiment.

The read-write control section 323B of an in-operation disk type storage device 300B prepares a copy of the old-version firmware 325B from the original old-version firmware 325B (e.g., prepares a copy in the same firmware group storage region 319B), and initiates processing that updates the original old-version firmware 325B to the transferred new-version firmware 325A (S141).

If the read-write control section 323B succeeds in updating the original old-version firmware 325B to the new-version firmware 325A (N in S142), the read-write control section 323B discards the copy of the old-version firmware 325B (S143), and executes restarting (S145).

On the other hand, when the read-write control section 323 [B] fails in the updating of the original old-version firmware 325B to the new-version firmware 325A because of a failure in the transfer of the new-version firmware 325A (Y in step S142), the read-write control section 323B restores the original old-version firmware 325B using the copy of the old-version firmware 325B (e.g., replaces the original old-version firmware 325B with the copy of the old-version firmware 325B) (S144), and executes restarting (S125).

In this third modification, even if there is a failure in the updating of the original old-version firmware 325B to the new-version firmware 325A, the old-version firmware 325B is restored using a copy of the old-version firmware 325B; accordingly, the same in-operation disk type storage device 300B can be used even after such a failure.

(D) Fourth Modification

Figure 15:
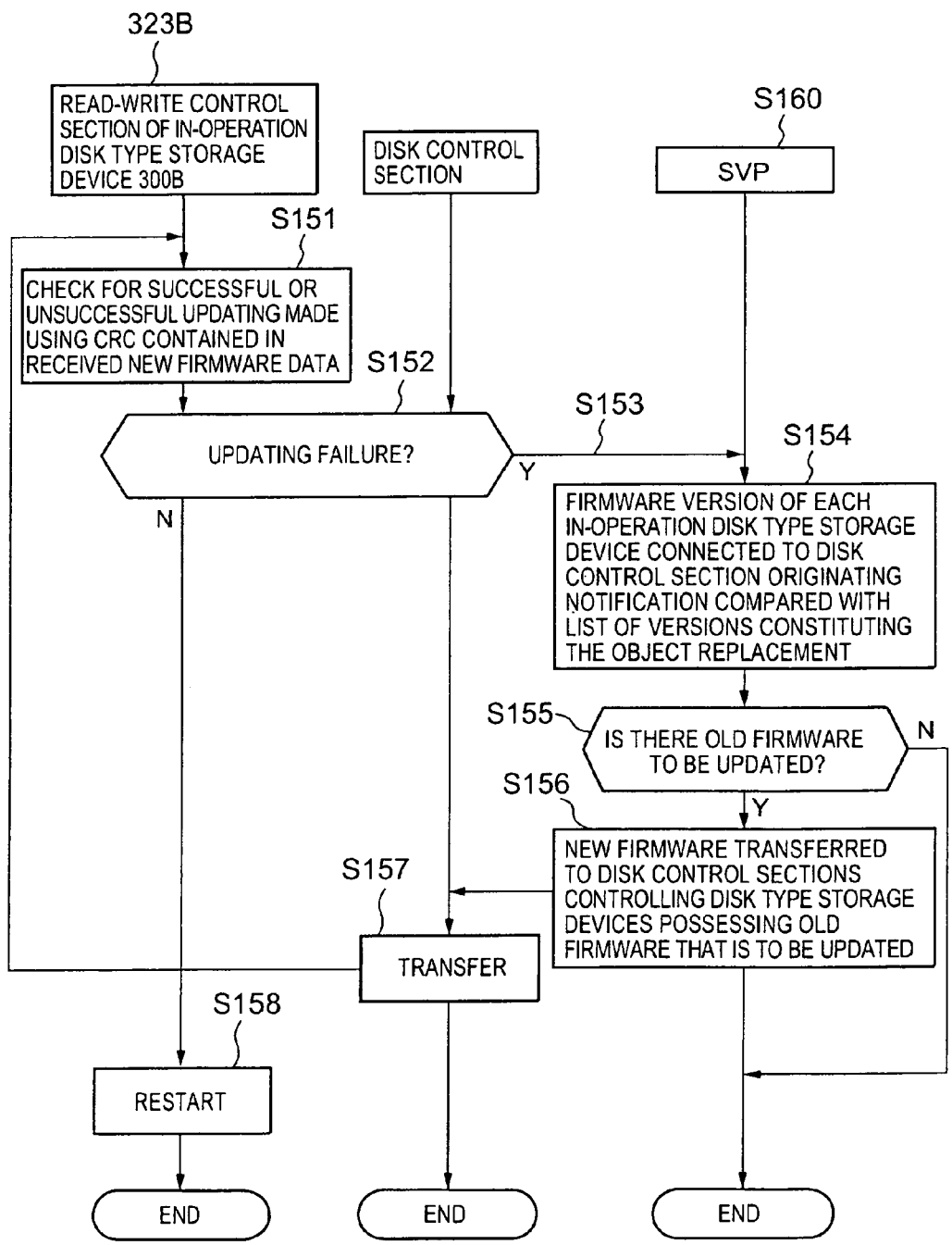
FIG. 15 shows the flow of the processing in a fourth modification of the present embodiment.

FIG. 15 shows the flow of processing in a fourth modification of the present embodiment.

In this fourth modification of the present embodiment, even if there is a failure in the acquisition of the new-version firmware 325A read out to the CM 130 or SM 120 and the updating of old-version firmware 325B, the new-version firmware 325A can be acquired from the SVP 160 so that the old-version firmware 325B can be updated.

For example, the read-write control section 323B of each in-operation disk type storage device 300B judges whether or not reception of the new-version firmware 325A and updating have been successfully accomplished by using a data code (e.g., a CRC (cyclic redundancy check) code) that is contained in the received new-version firmware 325A (S151).

If it is judged in the results of S151 that reception and updating have been successfully accomplished, the read-write control section 323B executes restarting (S158).

On the other hand, if it is judged in the results of S151 that there has been a failure in either reception or updating, the disk control section connected to the same fibre channel loop 390 as the disk type storage device 300B in question notifies the SVP 160 that there has been a firmware updating failure (S153).

The disk control section that has received such a notification of a firmware updating failure compares the plurality of old-version firmware versions respectively possessed by the plurality of disk type storage devices 300B connected to this disk control section, and the one or more listed old versions that are written into the list of replacement target versions 327 (S154). As a result, if at least one of the plurality of old-version firmware versions matches at least one of the one or more listed old versions, the new-version firmware 325A is transferred to the disk type storage devices 300B which have firmware of the matching old version via the disk control section (S156, S157). Subsequently, S151 is performed, and if N is obtained in S152, the in-operation disk type storage devices 300B in question execute restarting, and operate using the new-version firmware 325A.

In this fourth modification, even if there is a failure in the acquisition of the new-version firmware 325A that is read out to the CM 130 or SM 120, and the updating of the old-version firmware 325B, the new-version firmware 325A can be acquired from the SVP 160, so that the old-version firmware 325B can be updated.

(E) Fifth Modification

Figure 16:
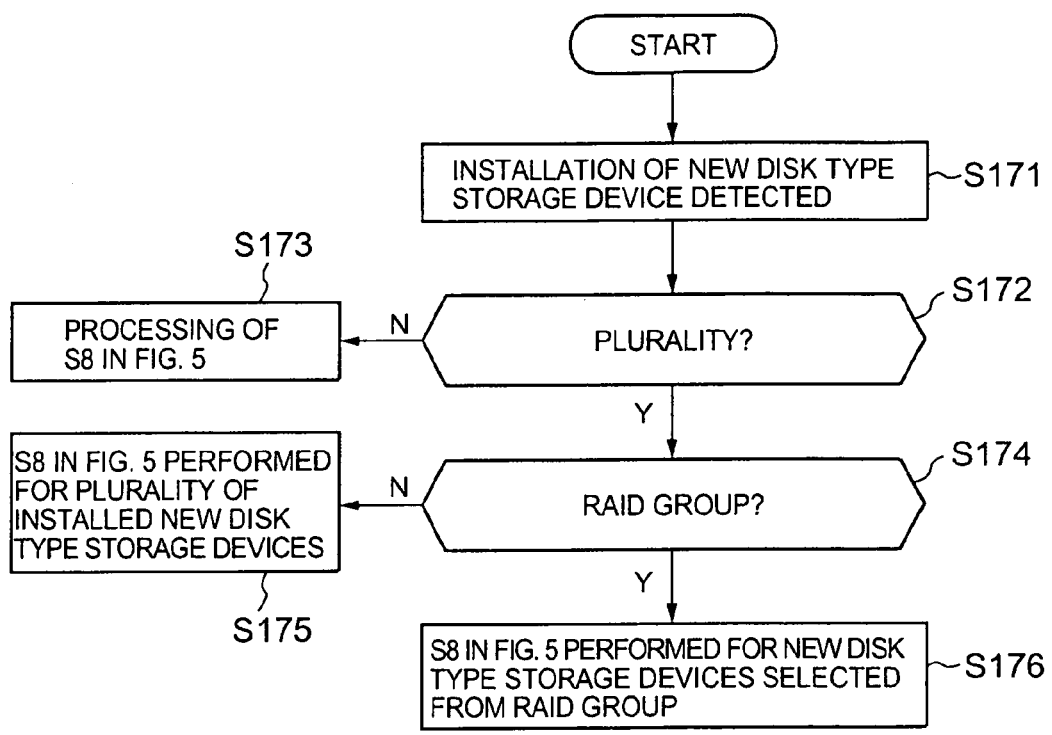
FIG. 16 shows the flow of the processing in a fifth modification of the present embodiment.

FIG. 16 shows the flow of the processing in a fifth modification of the present embodiment.

When it is detected that a new disk type storage device 300A has been installed in the storage control system 600 (S117), if the number of installed new disk type storage devices 300A is not a plurality (N in S172), the processing of S8 in the abovementioned FIG. 5 is performed (S173).

If the number of new disk type storage devices 300A in S172 is a plurality (Y in S172), it is judged by the disk control section that detected the installation of the new disk type storage devices 300A whether or not the plurality of disk type storage devices 300A form the same RAID group 2 (S174).

In S174, if the plurality of installed new disk type storage devices 300A are not contained in the same RAID group 2, S8 of FIG. 5 is performed for all of the installed new disk type storage devices 300A (S175).

In S174, if the plurality of installed new disk type storage devices 300A are contained in the same RAID group 2, S8 of FIG. 5 is performed for one new disk type storage device 300A selected from this RAID group 2 (S176).

An embodiment and modifications of the present invention have been described above. However, these are examples used to illustrate the present invention, and the scope of the present invention is not limited to the abovementioned embodiment and modifications alone. The present invention can be worked in various other aspects as well.

What is claimed is:

1. A storage control system which is connected to a host device, comprising:
    a channel control section which is connected to the host device and which receives data from said host device;
    a cache memory which is connected to said channel control section, and which saves data that is exchanged with said host device;
    a shared memory which stores control information relating to data that is exchanged with said host device;
    a plurality of disk control sections which are connected to said cache memory, and which control said data that is exchanged with said host device such that said data is stored in or read out from said cache memory; and
    a plurality of disk type storage devices which are connected with said plurality of disk control sections using a plurality of fibre channel loops, and in which data, that has been sent from said host device by the control of said plurality of disk control sections, is stored,
    wherein said plurality of disk type storage devices include two or more in-operation disk type storage devices which have already been installed in said storage control system, and a read-out source disk type storage device which is installed in said storage control system later than said two or more in-operation disk type storage devices, and which has transfer target firmware that is to be transferred to a read-out destination disk type storage device selected from said two or more in-operation disk type storage devices,
    wherein at least one of said plurality of disk control sections is connected to a same fibre channel loop as said read-out source disk type storage device operates as a read-out source disk control section,
    wherein at least one of said plurality of disk control sections is connected to a same fibre channel loop as said read-out destination disk type storage device operates as a read-out destination disk control section,
    wherein the read-out source disk control section reads out the transfer target firmware from said read-out source disk type storage device, and stores said read-out transfer target firmware in said cache memory, said shared memory or a maintenance terminal which is connected to said plurality of disk control sections and which maintains or manages said storage control system,
    wherein the read-out destination disk control section transfers said stored transfer target firmware to said read-out destination disk type storage device via the fibre channel loop connected to said read-out destination disk control section, and stores the transfer target firmware in said read-out destination disk type storage device, wherein said read-out source disk control section reads out said transfer target firmware from said read-out source disk type storage device when it is detected that said read-out source disk type storage device has been installed in said storage control system, wherein said transfer target firmware is a new-version firmware of a newer version than an old-version firmware possessed by said read-out destination disk type storage device, wherein said read-out destination disk type storage device updates the old-version firmware possessed by said read-out destination disk type storage device to said new-version firmware, wherein said read-out source disk type storage device stores update target old-version information in which one or more update target old versions that are to be updated to said new-version firmware are written, in addition to said new-version firmware, wherein said read-out source disk control section reads out said new-version firmware and said update target old-version information from said read-out source disk type storage device, and stores said information in a firmware storage region disposed in said cache memory, wherein said read-out destination disk control section compares the update target old-version information that is stored in said firmware storage region and the old versions of the two or more sets of old-version firmware respectively possessed by two or more in-operation disk type storage devices connected to the same fibre channel loop as said read-out destination disk control section, and when at least one of said two or more old versions matches at least one of said one or more update target old versions, the read-out destination disk type storage device which has the old-version firmware of said matching old version is selected from said two or more in-operation disk type storage devices, and said new-version firmware in said firmware storage region is transferred to said selected read-out destination disk type storage device, and wherein said firmware storage region can be accessed by all of said plurality of disk control sections.

2. A storage control system which is connected to a host device, comprising:

a channel control section which is connected to the host device and which receives data from said host device;

a cache memory which is connected to said channel control section, and which saves data that is exchanged with said host device;

a shared memory which stores control information relating to data that is exchanged with said host device;

a plurality of disk control sections which are connected to said cache memory, and which control said data that is exchanged with said host device such that said data is stored in or read out from said cache memory; and a plurality of disk type storage devices which are connected with said plurality of disk control sections using a plurality of fibre channel loops, and in which data, that has been sent from said host device by the control of said plurality of disk control sections, is stored, wherein said plurality of disk type storage devices include two or more in-operation disk type storage devices which have already been installed in said storage control system, and a read-out source disk type storage device which is installed in said storage control system later than said two or more in-operation disk type storage devices, and which has transfer target firmware that is to be transferred to a read-out destination disk type storage device selected from said two or more in-operation disk type storage devices, wherein at least one of said plurality of disk control which is connected to a same fibre channel loop as said read-out source disk type storage device operates as a read-out source disk control section, which at least one of said plurality of disk control sections is connected to a same fibre channel loop as said read-out destination disk type storage device operates as a read-out destination disk control section, wherein the read-out source disk control section reads out the transfer target firmware from said read-out source disk type storage device, and stores said read-out transfer target firmware in said cache memory, said shared memory or a maintenance terminal which is connected to said plurality of disk control sections and which maintains or manages said storage control system, wherein the read-out destination disk control section transfers said stored transfer target firmware to said read-out destination disk type storage device via the fibre channel loop connected to said read-out destination disk control section, and stores the transfer target firmware in said read-out destination disk type storage device, wherein said read-out source disk control section reads out said transfer target firmware from said read-out source disk type storage device when it is detected that said read-out source disk type storage device has been installed in said storage control system, wherein said transfer target firmware is a new-version firmware of a newer version than an old-version firmware possessed by said read-out destination disk type storage device, wherein said read-out destination disk type storage device updates the old-version firmware possessed by said read-out destination disk type storage device to said new-version firmware, wherein said read-out source disk type storage device stores update target old-version information in which one or more update target old versions that are to be updated to said new-version firmware are written, in addition to said new-version firmware, wherein said read-out source disk control section reads out said new-version firmware and said update target old-version information from said read-out source disk type storage device, and stores said information in a read-out destination region disposed in said shared memory, wherein said read-out destination disk control section compares the update target old-version information that is stored in said read-out destination region and the old versions of the two or more sets of old-version firmware respectively possessed by two or more in-operation disk type storage devices connected to the same fibre channel loop as said read-out destination disk control section, and when at least one of said two or more old versions matches at least one of said one or more update target old versions, the read-out destination disk type storage device which has the old-version firmware of said matching old version is selected from said two or more in-operation disk type storage devices, and said new-version firmware in said read-out destination region is transferred to said selected read-out destination disk type storage device, and wherein said read-out destination region can be accessed only by said read-out source disk control section and said read-out destination disk control section among said plurality of disk control sections.

3. A storage control system which is connected to a host device, comprising:

a channel control section which is connected to the host device and which receives data from said host device;

a cache memory which is connected to said channel control section, and which saves data that is exchanged with said host device;

a shared memory which stores control information relating to data that is exchanged with said host device;

a plurality of disk control sections which are connected to said cache memory, and which control said data that is exchanged with said host device such that said data is stored in or read out from said cache memory; and a plurality of disk type storage devices which are connected with said plurality of disk control sections using a plurality of fibre channel loops, and in which data, that has been sent from said host device by the control of said plurality of disk control sections is stored, wherein said plurality of disk type storage devices include two or more in-operation disk type storage devices which have already been installed in said storage control system, and a read-out source disk type storage device which is installed in said storage control system later than said two or more in-operation disk type storage devices, and which has transfer target firmware that is to be transferred to a read-out destination disk type storage device selected from said two or more in-operation disk type storage devices, wherein at least one of said plurality of disk control sections is connected to a same fibre channel loop as said read-out source disk type storage device operates as a read-out source disk control section, wherein at least one of said plurality of disk control sections is connected to a same fibre channel loop as said read-out destination disk type storage device operates as a read-out destination disk control section, wherein the read-out source disk control section reads out the transfer target firmware from said read-out source disk type storage device, and stores said read-out transfer target firmware in said cache memory, said shared memory or a maintenance terminal which is connected to said plurality of disk control sections and which maintains or manages said storage control system, wherein the read-out destination disk control section transfers said stored transfer target firmware to said read-out destination disk type storage device via the fibre channel loop connected to said read-out destination disk control section, and stores the transfer target firmware in said read-out destination disk type storage device, wherein said read-out source disk control section reads out said transfer target firmware from said read-out source disk type storage device when it is detected that said read-out source disk type storage device has been installed in said storage control system, wherein said transfer target firmware is a new-version firmware of a newer version than an old-version firmware possessed by said read-out destination disk type storage device, wherein said read-out destination disk type storage device updates the old-version firmware possessed by said read-out destination disk type storage device to said new-version firmware, wherein said read-out source disk type storage device stores update target old-version information in which one or more update target old versions that are to be updated to said new-version firmware are written, in addition to said new-version firmware, wherein said read-out source disk control section reads out said new-version firmware and said update target old-version information from said read-out source disk type storage device, and transmits said information to said maintenance terminal, wherein said maintenance terminal comprises a storage unit, said new-version firmware and said update target old-version information that are received from said read-out source disk control section are stored in said storage unit, the old versions of two or more sets of old-version firmware respectively possessed by two or more in-operation disk type storage devices that are connected to the same fibre channel loop as said read-out destination disk control section is received from said read-out destination disk control section and stored in said storage unit, the update target old-version information that is stored in said storage unit is compared with the two or more old versions stored in said storage unit, and when at least one of said two or more old versions matches at least one of said one or more update target old versions, the read-out destination disk type storage device which has the old-version firmware of said matching old version is selected from said two or more in-operation disk type storage devices, and said new-version firmware acquired from said storage unit is transmitted to said read-out destination disk control section with said selected read-out destination disk type storage device as the destination, and wherein said read-out destination disk control section receives said new-version firmware addressed to said selected read-out destination disk type storage device from said maintenance terminal, and transfers said new-version firmware to said selected read-out destination disk type storage device.

4. A storage control system which is connected to a host device, comprising:

a channel control section which is connected to the host device and which receives data from said host device;

a cache memory which is connected to said channel control section, and which saves data that is exchanged with said host device;

a shared memory which stores control information relating to data that is exchanged with said host device;

a plurality of disk control sections which are connected to said cache memory, and which control said data that is exchanged with said host device such that said data is stored in or read out from said cache memory; and a plurality of disk type storage devices which are connected with said plurality of disk control sections using a plurality of fibre channel loops, and in which data, that has been sent from said host device by the control of said plurality of disk control sections, is stored, wherein said plurality of disk type storage devices include two or more in-operation disk type storage devices which have already been installed in said storage control system, and a read-out source disk type storage device which is installed in said storage control system later than said two or more in-operation disk type storage devices, and which has transfer target firmware that is to be transferred to a read-out destination disk type storage device selected from said two or more in-operation disk type storage devices, wherein at least one of said plurality of disk control sections is connected to a same fibre channel loop as said read-out source disk type storage device operates as a read-out source disk control section, wherein at least one of said plurality of disk control sections is connected to a same fibre channel loop as said read-out destination disk type storage device operates as a read-out destination disk control section, wherein the read-out source disk control section reads out the transfer target firmware from said read-out source disk type storage device, and stores said read-out transfer target firmware in said cache memory, said shared memory or a maintenance terminal which is connected to said plurality of disk control sections and which maintains or manages said storage control system, wherein the read-out destination disk control section transfers said stored transfer target firmware to said read-out destination disk type storage device via the fibre channel loop connected to said read-out destination disk control section, and stores the transfer target firmware in said read-out destination disk type storage device, wherein said read-out source disk type storage device stores disk attribute information that includes disk attributes of one or more disk type storage devices in which said transfer target firmware can operate normally, wherein said read-out source disk control section reads out said disk attribute information from said read-out source disk type storage device, and stores this information in said cache memory, said shared memory or said maintenance terminal, wherein said read-out destination disk control section compares said stored disk attribute information with two or more disk attributes respectively corresponding to the two or more in-operation disk type storage devices connected to the same fibre channel loop as said read-out destination disk control section, and wherein when at least one of said two or more disk attributes matches at least one of the one or more disk attributes contained in said disk attribute information, the read-out destination disk type storage device which has said matching disk attribute is selected from said two or more in-operation disk type storage devices, and said new-version firmware is transferred to said selected read-out destination disk type storage device.

5. A storage control system which is connected to a host device, comprising:

a channel control section which is connected to the host device and which receives data from said host device;

a cache memory which is connected to said channel control section, and which saves data that is exchanged with said host device;

a shared memory which stores control information relating to data that is exchanged with said host device;

a plurality of disk control sections which are connected to said cache memory, and which control said data that is exchanged with said host device such that said data is stored in or read out from said cache memory; and a plurality of disk type storage devices which are connected with said plurality of disk control sections using a plurality of fibre channel loops, and in which data, that has been sent from said host device by the control of said plurality of disk control sections, is stored, wherein said plurality of disk type storage devices include two or more in-operation disk type storage devices which have already been installed in said storage control system, and a read-out source disk type storage device which is installed in said storage control system later than said two or more in-operation disk type storage devices, and which has transfer target firmware that is to be transferred to a read-out destination disk type storage device selected from said two or more in-operation disk type storage devices, wherein at least one of said plurality of disk control sections is connected to a same fibre channel loop as said read-out source disk type storage device operates as a read-out source disk control section, wherein at least one of said plurality of disk control sections is connected to a same fibre channel loop as said read-out destination disk type storage device operates as a read-out destination disk control section, wherein the read-out source disk control section reads out the transfer target firmware from said read-out source disk type storage device, and stores said read-out transfer target firmware in said cache memory, said shared memory or a maintenance terminal which is connected to said plurality of disk control sections and which maintains or manages said storage control system, wherein the read-out destination disk control section transfers said stored transfer target firmware to said read-out destination disk type storage device via the fibre channel loop connected to said read-out destination disk control section, and stores the transfer target firmware in said read-out destination disk type storage device, wherein the read-out destination disk type storage device exchanges data with said read-out destination disk control section using either first or second firmware, the other firmware that is not in use is updated to said transfer target firmware, and wherein when the use of said first or second firmware that is in use is completed, said firmware that was in use is updated to said transfer target firmware.

6. A storage control system which is connected to a host device, comprising:

a channel control section which is connected to the host device and which receives data from said host device;

a cache memory which is connected to said channel control section, and which saves data that is exchanged with said host device;

a shared memory which stores control information relating to data that is exchanged with said host device;

a plurality of disk control sections which are connected to said cache memory, and which control said data that is exchanged with said host device such that said data is stored in or read out from said cache memory; and a plurality of disk type storage devices which are connected with said plurality of disk control sections using a plurality of fibre channel loops, and in which data, that has been sent from said host device by the control of said plurality of disk control sections, is stored, wherein said plurality of disk type storage devices include two or more in-operation disk type storage devices which have already been installed in said storage control system, and a read-out source disk type storage device which is installed in said storage control system later than said two or more in-operation disk type storage devices, and which has transfer target firmware that is to be transferred to a read-out destination disk type storage device selected from said two or more in-operation disk type storage devices, wherein at least one of said plurality of disk control sections is connected to a same fibre channel loop as said read-out source disk type storage device operates as a read-out source disk control section, wherein at least one of said plurality of disk control sections is connected to a same fibre channel loop as said read-out destination disk type storage device operates as a read-out destination disk control section, wherein the read-out source disk control section reads out the transfer target firmware from said read-out source disk type storage device, and stores said read-out transfer target firmware in said cache memory, said shared memory or a maintenance terminal which is connected to said plurality of disk control sections and which maintains or manages said storage control system, wherein the read-out destination disk control section transfers said stored transfer target firmware to said read-out destination disk type storage device via the fibre channel loop connected to said read-out destination disk control section, and stores the transfer target firmware in said read-out destination disk type storage device, wherein said read-out source disk control section transmits said read-out transfer target firmware to said maintenance terminal, and wherein when there is a failure in the transfer of said transfer target firmware read out from said cache memory or said shared memory to said read-out destination disk type storage device, said read-out source disk control section notifies said maintenance terminal that there has been a transfer failure, and when said transfer target firmware is received from said maintenance terminal in response to said notification of a transfer failure, said received transfer target firmware is transferred to said read-out destination disk type storage device.

7. A storage control system which is connected to a host device, comprising:

a channel control section which is connected to the host device and which receives data from said host device;

a cache memory which is connected to said channel control section, and which saves data that is exchanged with said host device;

a shared memory which stores control information relating to data that is exchanged with said host device;

a plurality of disk control sections which are connected to said cache memory, and which control said data that is exchanged with said host device such that said data is stored in or read out from said cache memory; and a plurality of disk type storage devices which are connected with said plurality of disk control sections using a plurality of fibre channel loops, and in which data, that has been sent from said host device by the control of said plurality of disk control sections, is stored, wherein said plurality of disk type storage devices include two or more in-operation disk type storage devices which have already been installed in said storage control system, and a read-out source disk type storage device which is installed in said storage control system later than said two or more in-operation disk type storage devices, and which has transfer target firmware that is to be transferred to a read-out destination disk type storage device selected from said two or more in-operation disk type storage devices, wherein at least one of said plurality of disk control sections is connected to a same fibre channel loop as said read-out source disk type storage device operates as a read-out source disk control section, wherein at least one of said plurality of disk control sections is connected to a same fibre channel loop as said read-out destination disk type storage device operates as a read-out destination disk control section, wherein the read-out source disk control section reads out the transfer target firmware from said read-out source disk type storage device, and stores said read-out transfer target firmware in said cache memory, said shared memory or a maintenance terminal which is connected to said plurality of disk control sections and which maintains or manages said storage control system, wherein the read-out destination disk control section transfers said stored transfer target firmware to said read-out destination disk type storage device via the fibre channel loop connected to said read-out destination disk control section, and stores the transfer target firmware in said read-out destination disk type storage device, wherein two or more read-out source disk type storage devices are included in said plurality of disk type storage devices, and wherein when two or more read-out source disk type storage devices constituting a same RAID group are installed, read-out source disk control section which is connected to the same fibre channel loop as the read-out source disk type storage device selected from said two or more read-out source disk type storage devices read out the transfer target firmware from said selected read-out source disk type storage device.

8. A method for installing firmware in disk type storage devices possessed by a storage control system connected to a host device, comprising the steps of:

reading out transfer target firmware that is to be transferred to a read-out destination disk type storage device selected from two or more in-operation disk type storage devices among a plurality of disk type storage devices disposed in said storage control system from a read-out source disk type storage device that was installed in said storage control system later than said two or more in-operation disk type storage devices;

storing said read-out transfer target firmware in a cache memory which saves data that is exchanged with said host device, a shared memory which stores control information relating to data that is exchanged with said host device, or a maintenance terminal which maintains or manages said storage control system; and transferring said stored transfer target firmware to said read-out destination disk type storage device and storing the transfer target firmware in the read-out destination disk type storage device, wherein said transfer target firmware is a new-version firmware of a newer version than an old-version firmware possessed by said read-out destination disk type storage device, wherein in said read-out step, when it is detected that said read-out source disk type storage device has been installed in said storage control system, said new-version firmware is read out from said read-out source disk type storage device, wherein in said storage step, the old-version firmware possessed said read-out destination disk type storage device is updated to said new-version firmware, wherein said read-out source disk type storage device stores update target old-version information in which one or more old versions (that are to be updated) of the old-version firmware that is to be updated to said new-version firmware are written, in addition to said new-version firmware, wherein in said read-out step, said new-version firmware and said update target old-version information are read out from said read-out source disk type storage device, wherein in said storage step, the firmware is stored in a firmware storage region disposed in said cache memory, and wherein in said transfer step, the update target old-version information that is stored in said firmware storage region is compared with the old versions of two or more sets of old-version firmware respectively possessed by two or more in-operation disk type storage devices that are connected to a same fibre channel loop as said read-out destination disk control section, and when at least one of said two or more old versions matches at least one of said one or more update target old versions, the read-out destination disk type storage device which has the old-version firmware of said matching old version is selected from said two or more in-operation disk type storage devices, and said new-version firmware in said firmware storage region is transferred to said selected read-out destination disk type storage device.

9. A method for installing firmware in disk type storage devices possessed by a storage control system connected to a host device, comprising the steps of:

reading out transfer target firmware that is to be transferred to a read-out destination disk type storage device selected from two or more in-operation disk type storage devices among a plurality of disk type storage devices disposed in said storage control system from a read-out source disk type storage device that was installed in said storage control system later than said two or more in-operation disk type storage devices;

storing said read-out transfer target firmware in a cache memory which saves data that is exchanged with said host device, a shared memory which stores control information relating to data that is exchanged with said host device, or a maintenance terminal which maintains or manages said storage control system; and transferring said stored transfer target firmware to said read-out destination disk type storage device and storing the transfer target firmware in the read-out destination disk type storage device, wherein said transfer target firmware is a new-version firmware of a newer version than an old-version firmware possessed by said read-out destination disk type storage device, wherein in said read-out step, when it is detected that said read-out source disk type storage device has been installed in said storage control system, said new-version firmware is read out from said read-out source disk type storage device, wherein in said storage step, the old-version firmware possessed said read-out destination disk type storage device is updated to said new-version firmware, wherein said read-out source disk type storage device stores update target old-version information in which one or more old versions, that are to be updated, of the old-version firmware that is to be updated to said new-version firmware are written, in addition to said new-version firmware, wherein in said read-out step, said new-version firmware and said update target old-version information are read out from said read-out source disk type storage device, wherein in said storage step, said read-out new-version firmware and said update target old-version information are stored in a read-out destination region disposed in said shared memory, and wherein in said transfer step, the update target old-version information that is stored in said read-out destination region is compared with the old versions of two or more sets of old-version firmware respectively possessed by two or more in-operation disk type storage devices that are connected to the same fibre channel loop as said read-out destination disk control section, and when at least one of said two or more old versions matches at least one of said one or more update target old versions, the read-out destination disk type storage device which has the old-version firmware of said matching old version are selected from said two or more in-operation disk type storage devices, and said new-version firmware in said read-out destination region is transferred to said read-out destination disk type storage device.

10. A method for installing firmware in disk type storage devices possessed by a storage control system connected to a host device, comprising the steps of:

reading out transfer target firmware that is to be transferred to a read-out destination disk type storage device selected from two or more in-operation disk type storage devices among a plurality of disk type storage devices disposed in said storage control system from a read-out source disk type storage device that was installed in said storage control system later than said two or more in-operation disk type storage devices;

storing said read-out transfer target firmware in a cache memory which saves data that is exchanged with said host device, a shared memory which stores control information relating to data that is exchanged with said host device, or a maintenance terminal which maintains or manages said storage control system; and transferring said stored transfer target firmware to said read-out destination disk type storage device and storing the transfer target firmware in the read-out destination disk type storage device, wherein said transfer target firmware is a new-version firmware of a newer version than an old-version firmware possessed by said read-out destination disk type storage device, wherein in said read-out step, when it is detected that said read-out source disk type storage device has been installed in said storage control system, said new-version firmware is read out from said read-out source disk type storage device, wherein in said storage step, the old-version firmware possessed said read-out destination disk type storage device is updated to said new-version firmware, wherein said read-out source disk type storage device stores update target old-version information in which one or more update target old versions of the old-version firmware that is to be updated to said new-version firmware is written, in addition to said new-version firmware, wherein said maintenance terminal has a storage unit, wherein in said read-out step, said new-version firmware and said update target old-version information are read out from said read-out source disk type storage device, wherein in said storage step, said new-version firmware that has been read out and said update target old-version information update target are transmitted to said maintenance terminal and stored in said storage unit of said maintenance terminal, and the old versions of two or more sets of old-version firmware respectively possessed by said two or more in-operation disk type storage devices are stored in the storage unit of said maintenance terminal, and wherein in said transfer step, the update target old-version information that is stored in said storage unit is compared with the two or more old versions that are stored in said storage unit, and when at least one of said two or more old versions matches at least one of said one or more update target old versions, the read-out destination disk type storage device which has the old-version firmware of said matching old version is selected from said two or more in-operation disk type storage devices, and said new-version firmware acquired from said storage unit is transferred to said selected read-out destination disk type storage device.

11. A method for installing firmware in disk type storage devices possessed by a storage control system connected to a host device, comprising the steps of:

reading out transfer target firmware that is to be transferred to a read-out destination disk type storage device selected from two or more in-operation disk type storage devices among a plurality of disk type storage devices disposed in said storage control system from a read-out source disk type storage device that was installed in said storage control system later than said two or more in-operation disk type storage devices;

storing said read-out transfer target firmware in a cache memory which saves data that is exchanged with said host device, a shared memory which stores control information relating to data that is exchanged with said host device, or a maintenance terminal which maintains or manages said storage control system; and transferring said stored transfer target firmware to said read-out destination disk type storage device and storing the transfer target firmware in the read-out destination disk type storage device, wherein said read-out source disk type storage device stores disk attribute information that includes disk attributes of one or more disk type storage devices in which said transfer target firmware can operate normally, wherein in said read-out step, said disk attribute information is read out from said read-out source disk type storage device, wherein in said storage step, said disk attribute information that has been read out is stored in said cache memory, said shared memory or said maintenance terminal; and wherein in said transfer step, said stored disk attribute information is compared with two or more disk attributes respectively corresponding to two or more in-operation disk type storage devices, and when at least one of said two or more disk attributes matches at least one of the one or more disk attributes contained in said disk attribute information, the read-out destination disk type storage device which has said matching disk attribute is selected from said two or more in-operation disk type storage devices, and said new-version firmware is transferred to said selected read-out destination disk type storage device.

12. A method for installing firmware in disk type storage devices possessed by a storage control system connected to a host device, comprising the steps of:

reading out transfer target firmware that is to be transferred to a read-out destination disk type storage device selected from two or more in-operation disk type storage devices among a plurality of disk type storage devices disposed in said storage control system from a read-out source disk type storage device that was installed in said storage control system later than said two or more in-operation disk type storage devices;

storing said read-out transfer target firmware in a cache memory which saves data that is exchanged with said host device, a shared memory which stores control information relating to data that is exchanged with said host device, or a maintenance terminal which maintains or manages said storage control system; and transferring said stored transfer target firmware to said read-out destination disk type storage device and storing the transfer target firmware in the read-out destination disk type storage device, wherein when the read-out destination disk type storage device is exchanging data with said read-out destination disk control section using either the first or second firmware in said storage step, the other firmware that is not in use is updated to said transfer target firmware, and wherein when the use of said first or second firmware that was in use is completed, this firmware is updated to said transfer target firmware.

13. A method for installing firmware in disk type storage devices possessed by a storage control system connected to a host device, comprising the steps of:

reading out transfer target firmware that is to be transferred to a read-out destination disk type storage device selected from two or more in-operation disk type storage devices among a plurality of disk type storage devices disposed in said storage control system from a read-out source disk type storage device that was installed in said storage control system later than said two or more in-operation disk type storage devices;

storing said read-out transfer target firmware in a cache memory which saves data that is exchanged with said host device, a shared memory which stores control information relating to data that is exchanged with said host device, or a maintenance terminal which maintains or manages said storage control system; and transferring said stored transfer target firmware to said read-out destination disk type storage device and storing the transfer target firmware in the read-out destination disk type storage device;

notifying said maintenance terminal of a transfer failure when there is a failure in the transfer of the transfer target firmware that is read out from said cache memory or said shared memory to said read-out destination disk type storage device, wherein in said transfer step, said transfer target firmware that is output from said maintenance terminal in response to said notification of transfer failure is transferred to said read-out destination disk type storage device.

14. A method for installing firmware in disk type storage devices possessed by a storage control system connected to a host device, comprising the steps of:

reading out transfer target firmware that is to be transferred to a read-out destination disk type storage device selected from two or more in-operation disk type storage devices among a plurality of disk type storage devices disposed in said storage control system from a read-out source disk type storage device that was installed in said storage control system later than said two or more in-operation disk type storage devices;

storing said read-out transfer target firmware in a cache memory which saves data that is exchanged with said host device, a shared memory which stores control information relating to data that is exchanged with said host device, or a maintenance terminal which maintains or manages said storage control system; and transferring said stored transfer target firmware to said read-out destination disk type storage device and storing the transfer target firmware in the read-out destination disk type storage device, wherein said plurality of disk type storage devices include two or more read-out source disk type storage devices, and wherein in said read-out step, when two or more read-out source disk type storage devices forming a same RAID group are installed, a disk control section connected to a same fibre channel loop as the read-out source disk type storage device selected from said two or more read-out source disk type storage devices read out the transfer target firmware from said selected read-out source disk type storage device.

* * * * *